US012670312B2

(12) United States Patent
Marom et al.

(10) Patent No.: US 12,670,312 B2
(45) Date of Patent: Jun. 30, 2026

(54) INTELLIGENT DOCUMENT CREATION AND REVIEW GENERATED BY A LARGE LANGUAGE MODEL

(71) Applicant: Dropbox, Inc., San Francisco, CA (US)

(72) Inventors: Shahar Marom, Sunnyvale, CA (US); Adam Botsford, Fort Worth, TX (US); Anagha Mudigonda, Cupertino, CA (US); Brian Erkkinen, Clinton, MA (US); Sainish Momin, San Ramon, CA (US); Ethan Heimlich, New York, NY (US)

(73) Assignee: Dropbox, Inc., San Francisco, CA (US)

( * ) Notice: Subject to any disclaimer, the term of this patent is extended or adjusted under 35 U.S.C. 154(b) by 133 days.

(21) Appl. No.: 18/395,089

(22) Filed: Dec. 22, 2023

(65) Prior Publication Data

US 2025/0209256 A1 Jun. 26, 2025

(51) Int. Cl.
| | |
|---|---|
| *G06F 40/00* | (2020.01) |
| *G06F 16/34* | (2019.01) |
| *G06F 40/106* | (2020.01) |
| *G06F 40/166* | (2020.01) |

(52) U.S. Cl.
CPC .......... *G06F 40/166* (2020.01); *G06F 16/345* (2019.01); *G06F 40/106* (2020.01)

(58) Field of Classification Search
CPC ..... G06F 40/166; G06F 16/345; G06F 40/106
See application file for complete search history.

(56) References Cited

U.S. PATENT DOCUMENTS

| | | | | |
|---|---|---|---|---|
| 9,413,739 | B1 * | 8/2016 | Rose ........................ | H04L 63/08 |
| 11,301,616 | B1 * | 4/2022 | Salehian ................. | G06F 21/64 |
| 11,429,651 | B2 * | 8/2022 | Avery .................. | G06Q 10/101 |
| 11,526,662 | B2 | 12/2022 | Ship et al. | |
| 11,593,439 | B1 * | 2/2023 | Avadhani .............. | G06F 16/325 |
| 2002/0049906 | A1 * | 4/2002 | Maruyama ......... | G06Q 20/0855 |
| | | | | 713/176 |

(Continued)

OTHER PUBLICATIONS

Gulen, Kerem, "Gamma.app: Create and edit presentations with AI chatbot", dataconomy.com. Sep. 5, 2023, 10 pages.*

(Continued)

*Primary Examiner* — Wilson W Tsui
*Assistant Examiner* — David Faber
(74) *Attorney, Agent, or Firm* — Keller Preece PLLC

(57) ABSTRACT

The systems, methods, and non-transitory computer-readable media relates to the intelligent generation and completion of digital documents. For example, the disclosed systems provide a document creation interface for entering inputs to generate and modify digital documents. In some instances, the disclosed systems receive a document generation prompt, generate a digital document (e.g., using a large language model), and provide an indication of the generated digital document within the document creation interface. Moreover, the disclosed systems can further generate a document summary of the digital document and provide the document summary for a recipient device via a document review interface. Additionally, the disclosed systems can further generate a suggested document modification element and modify the digital document in response to a user interaction with the suggested document modification element using the large language model.

20 Claims, 22 Drawing Sheets

1500

Providing A Document Creation Interface That Includes A Text Field For Entertaining Text Prompts To Generate And Modify Digital Documents
*1502*

Receiving A Document Generation Prompt Defining Document Parameters *1504*

In Response To The Document Generation Prompt, Generating A Digital Document Using A Large Language Model To Process The Document Parameters *1506*

Providing An Indication Of The Digital Document For Display On The Requestor Device *1508*

(56) References Cited

U.S. PATENT DOCUMENTS

| | | | |
|---|---|---|---|
| 2005/0154702 A1* | 7/2005 | Liu | G06F 16/9535 |
| 2005/0210369 A1* | 9/2005 | Damm, Jr. | G06F 40/18 |
| | | | 715/213 |
| 2013/0021346 A1* | 1/2013 | Terman | G09B 5/08 |
| | | | 345/467 |
| 2016/0204944 A1 | 7/2016 | Follis et al. | |
| 2017/0322681 A1 | 11/2017 | Allison et al. | |
| 2018/0365201 A1 | 12/2018 | Hunn et al. | |
| 2019/0190724 A1* | 6/2019 | Sundaresan | H04L 9/3247 |
| 2020/0097557 A1* | 3/2020 | Houlette | G06F 16/338 |
| 2020/0104296 A1 | 4/2020 | Hunn et al. | |
| 2020/0364270 A1* | 11/2020 | Harpale | G06F 40/20 |
| 2020/0372202 A1* | 11/2020 | Hayslett | H04L 9/3247 |
| 2020/0379755 A1* | 12/2020 | Boada | G06F 40/232 |
| 2020/0410617 A1 | 12/2020 | Wichern et al. | |
| 2021/0125297 A1 | 4/2021 | Doran et al. | |
| 2022/0229860 A1 | 7/2022 | Ship et al. | |
| 2022/0245335 A1 | 8/2022 | Begun et al. | |
| 2022/0292268 A1 | 9/2022 | Shillingford et al. | |
| 2022/0398680 A1 | 12/2022 | Wodetzki et al. | |
| 2023/0049562 A1 | 2/2023 | Carbune et al. | |
| 2023/0134056 A1 | 5/2023 | Alvord | |
| 2023/0162304 A1 | 5/2023 | Hunn et al. | |
| 2023/0274084 A1 | 8/2023 | Modani et al. | |
| 2023/0308286 A1* | 9/2023 | Galligan | H04L 9/0631 |
| 2024/0086051 A1* | 3/2024 | Ciminelli | G06F 3/04845 |
| 2024/0086651 A1 | 3/2024 | Gogwilt et al. | |
| 2024/0111399 A1* | 4/2024 | Chung | G06F 40/14 |
| 2024/0160834 A1* | 5/2024 | Maganti | G06F 40/103 |
| 2024/0211638 A1* | 6/2024 | Chou | G06F 40/186 |
| 2024/0330580 A1 | 10/2024 | Hariri et al. | |
| 2024/0330605 A1 | 10/2024 | Hunn et al. | |
| 2024/0354321 A1* | 10/2024 | Kundel | G06F 16/3344 |
| 2024/0354436 A1* | 10/2024 | Mukherjee | G06F 16/3344 |
| 2024/0386058 A1* | 11/2024 | Thomas | G06F 40/103 |
| 2024/0386185 A1* | 11/2024 | Munoz | G06F 40/103 |
| 2024/0403568 A1* | 12/2024 | Øhrn | G06F 40/40 |
| 2024/0428005 A1* | 12/2024 | Abraham | G06F 16/38 |
| 2025/0103795 A1* | 3/2025 | Santra | G06N 3/09 |
| 2025/0103826 A1 | 3/2025 | Dicklin et al. | |
| 2025/0103867 A1* | 3/2025 | Dicklin | G06N 3/045 |
| 2025/0117605 A1* | 4/2025 | De Wynter | G06F 40/30 |
| 2025/0258848 A1 | 8/2025 | Szabo et al. | |

OTHER PUBLICATIONS

AI Neox, "How to Write a Contract using ChatGPT," [Retrieved on Oct. 5, 2023], 10 pages, Retrieved from the Internet: URL: https://aineox.com/en/how-to-write-a-contract-using-chatgpt/.

Luminance, "AI for End-to-End Contract Processing," 4 pages, Retrieved from the Internet: URL: https://www.luminance.com/files/brochures/Luminance%20Corporate%20%7C%20Product%20Sheet%20%7C%20End-to-End%20Contract%20Processing.pdf.

Shepherd J., "What are the Specific use Cases for Generative AI in Contract Drafting?," Medium, Sep. 2023, [Retrieved on Oct. 5, 2023], Retrieved from the Internet: URL: https://jackwshepherd.medium.com/what-are-the-specific-use-cases-for-generative-ai-in-contract-drafting-b738d8353b37. 34 pages.

Wong S., et al., "Construction Contract Risk Identification Based on Knowledge-augmented Language Model," arXiv, Sep. 22, 2023, 30 pages, Retrieved from the Internet: URL: https://arxiv.org/ftp/arxiv/papers/2309/2309.12626.pdf.

Non-Final Office Action from U.S. Appl. No. 18/395,099, mailed on Oct. 14, 2025, 14 pages.

Taylor L., "Luminance Corporate: New AI for Contract Negotiation and Management," Luminance, Nov. 5, 2021, 3 pages, Retrieved from the Internet: URL: https://www.luminance.com/news/blogs/20211105_luke_taylorsubjectmatterexpertatluminance.html.

* cited by examiner

1500

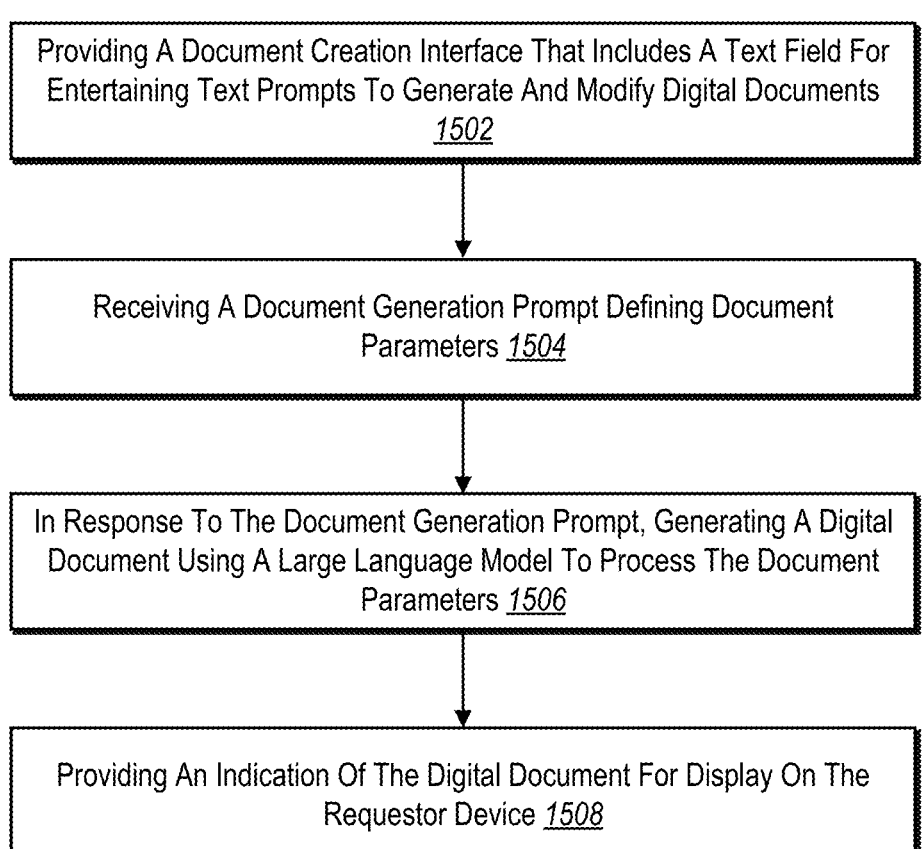

Providing A Document Creation Interface That Includes A Text Field For Entertaining Text Prompts To Generate And Modify Digital Documents *1502*

Receiving A Document Generation Prompt Defining Document Parameters *1504*

In Response To The Document Generation Prompt, Generating A Digital Document Using A Large Language Model To Process The Document Parameters *1506*

Providing An Indication Of The Digital Document For Display On The Requestor Device *1508*

*Fig. 15*

1600

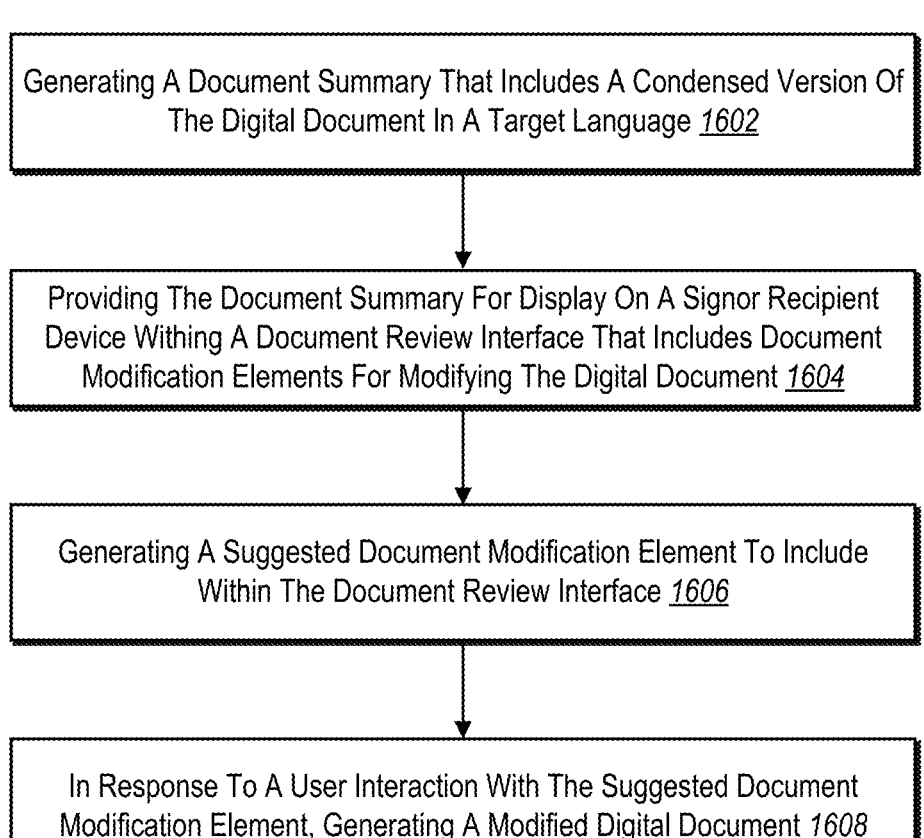

Generating A Document Summary That Includes A Condensed Version Of The Digital Document In A Target Language _1602_

Providing The Document Summary For Display On A Signor Recipient Device Withing A Document Review Interface That Includes Document Modification Elements For Modifying The Digital Document _1604_

Generating A Suggested Document Modification Element To Include Within The Document Review Interface _1606_

In Response To A User Interaction With The Suggested Document Modification Element, Generating A Modified Digital Document _1608_

Content
Management System
*1802*

Network
*1804*

User Client Device *1806*

INTELLIGENT DOCUMENT CREATION AND REVIEW GENERATED BY A LARGE LANGUAGE MODEL

BACKGROUND

Advancements in computing devices and networking technology have given rise to a variety of innovations in the digital signature space. For example, computing systems have developed that allow for requestors to send a request to obtain a digital signature from one or more signor recipient devices. Some existing computing systems in the digital signature space also provide the ability to track the progress of documents sent out for signatures and the ability to send out reminder notifications. Despite these advances, however, existing computing systems in the digital signature space continue to suffer from a number of disadvantages, particularly in terms of efficiency, accuracy, operational flexibility, and security.

As just suggested, certain existing computing systems are inefficient. More particularly, some existing systems require excessive user interactions to create a digital document to send out for obtaining a digital signature from one or more signor recipient devices. For instance, existing systems typically require excessive shuffling between multiple user interfaces and/or applications to create a digital document with the relevant information, create a compatible file type of the digital document, upload the digital document to the computing system, and add the correct placeholder fields for the signor recipient device(s) to fill in.

In addition to the inefficiency issues, existing computing systems are also inaccurate. For example, as just mentioned, existing computing systems typically require an excessive number of user interactions to create and send out a digital document. As such, existing computing systems suffer from sending out inaccurate (e.g., due to excessive interactions resulting in mistakes) or incomprehensible digital documents. Accordingly, in some such instances, existing computing systems suffer from wasted time and computational resources to rectify the inaccuracies.

Furthermore, in addition to inefficiency and inaccuracy, existing computing systems are also insecure. More particularly, some existing computing systems share information regarding a digital document across various third-party platforms. In some such instances, existing computing systems potentially expose and/or leak confidential or sensitive information to unauthorized third-party platforms. As such, existing systems suffer from security issues.

Moreover, existing computing systems are also inflexible. Indeed, as suggested, certain existing computing systems are rigidly fixed to an excessive number of steps to generate and send out a digital document, which results in spinning up resources for digital documents that need to be recalled and resent. Indeed, their inflexible nature prevents many existing computing systems from efficiently, accurately, and securely obtaining digital signatures.

SUMMARY

This disclosure describes one or more embodiments of systems, methods, and non-transitory computer-readable storage media that provide benefits and/or solve one or more of the foregoing and other problems in the art. For instance, the disclosed systems provide a document creation interface for display on a requestor device that includes an input field for entering text prompts to generate and modify digital documents. Moreover, in some instances the disclosed systems receive a document generation prompt with defined document parameters and utilizes a large language model to generate a digital document. Furthermore, in some such instances, the disclosed systems also provide a selectable indication of the digital document for the requestor device within the document creation interface.

In one or more embodiments, the disclosed systems further generate a document summary of the digital document and provides the document summary for display on a signor recipient device within a document review interface with document modification elements. In some instances, the disclosed systems generate suggested document modification elements to include within the document review interface and generates, using the large language model, a modified digital document to provide to the requestor device.

BRIEF DESCRIPTION OF THE DRAWINGS

This disclosure will describe one or more example implementations of the systems and methods with additional specificity and detail by referencing the accompanying figures. The following paragraphs briefly describe those figures, in which:

FIG. 15 illustrates an example series of acts performed by the intelligent document system in accordance with one or more embodiments;

FIG. 16 illustrates an example series of acts performed by the intelligent document system in accordance with one or more embodiments;

DETAILED DESCRIPTION

Figure 1:
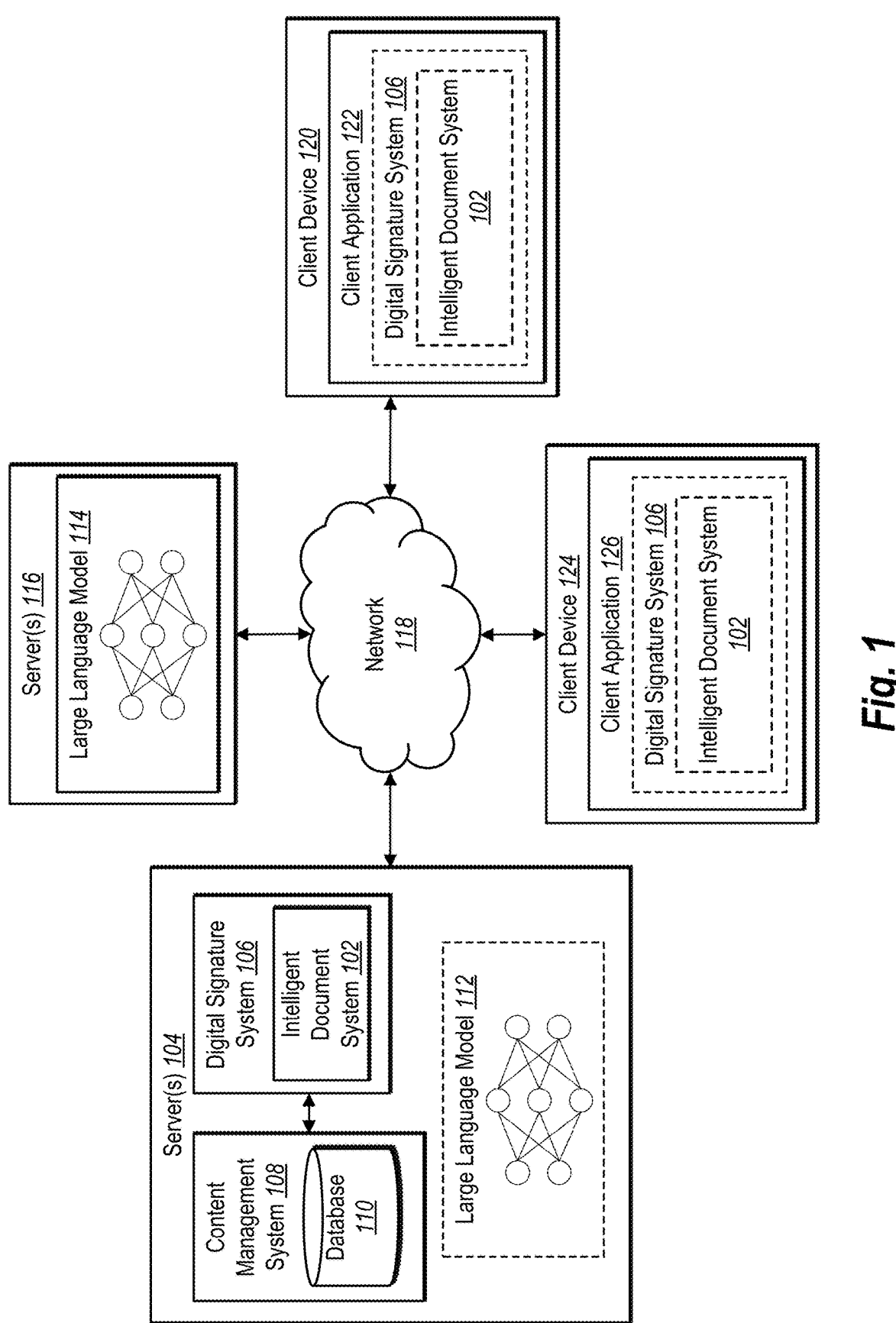
FIG. 1 illustrates a schematic diagram of an example environment of an intelligent document system in accordance with one or more embodiments.

This disclosure describes one or more embodiments of an intelligent document system that generates and modifies digital documents utilizing a large language model and further assists a recipient device in suggesting modifications to the digital document. For example, the intelligent document system intelligently assists in the generation and completion of digital documents (e.g., digital contracts) and reduces the number of interactions of both requestors and recipient devices. For instance, the intelligent document system utilizes a large language model in tandem with a content management system to create various types of digital documents, summarize digital documents for the requestor and the recipient device(s), translate digital documents, provide intelligent metrics for improving digital documents, and further provides tools to a recipient device to modify the digital document. In other words, the intelligent document system provides smart features prior to sending a digital document to recipient device(s) and also provides smart features after sending the digital document to recipient device(s).

As mentioned, the intelligent document system intelligently assists in the generation of digital documents. In one or more embodiments, the intelligent document system provides a document creation interface to a requestor device to create and modify digital documents (e.g., contracts). For instance, the intelligent document system receives a digital text prompt and utilizes a large language model via the document creation interface to generate the digital document based on the digital text prompt.

Moreover, in one or more embodiments, the intelligent document system modifies generated digital documents on the fly with additional digital text prompts. To illustrate, the intelligent document system can receive a document modification prompt to change a term, add a clause, change formatting, adjust the tone, or add other content into the digital document. In some such instances, the intelligent document system re-generates the digital document according to the additional text prompts. In doing so, the intelligent document system provides a streamlined method for quickly and efficiently iterating through different variations of a digital document, all within the same user-interface.

Further, in one or more embodiments, the intelligent document system accesses content within a content management system for storing content items. For example, the intelligent document system can draw from existing content within the content management system to generate the digital document (e.g., a contract). Furthermore, in some instances, the intelligent document system receives indications from a requestor device, pointing to specific content to use to generate the digital document. Moreover, in some instances, the intelligent document system identifies content with high completion rates and utilizes the content with high completion rates to further generate the digital document (e.g., to maximize completion based on previous performance).

Additionally, in some embodiments the intelligent document system sends a digital text prompt, content items from the content management system, and predefined document parameters to the large language model. In doing so, the intelligent document system generates a response based on the received information in a specified format and further generates the response as a file (e.g., a PDF file) to provide to the requestor device.

Further, in some embodiments the intelligent document system also provides answers to digital text prompts regarding the generated digital document. For instance, the intelligent document system provides responses to digital text prompts regarding content within the digital document, suggestions to improve the digital document (e.g., to increase a predicted completion rate), and timing predictions to predict how long before a digital document would be completed.

As also mentioned above, the intelligent document system also assists a recipient device in suggesting modifications to the digital document. In one or more embodiments, the intelligent document system generates a summary of the digital document and provides the summary to a recipient device (e.g., a signor recipient device). Further, in some instances the intelligent document system provides a summary of the digital document to a recipient device in a target language (e.g., by translating the digital document into a target language utilizing the large language model).

Moreover, in one or more embodiments, the intelligent document system further provides a document review interface for a recipient device to review the digital document. For example, the intelligent document system provides in the document review interface, document modification elements to change the digital document. Moreover, in some instances, the intelligent document system further generates suggested document modification elements to include within the document review interface. In some such instances, the intelligent document system bases the suggested document modifications on digital documents within a content management system (e.g., of the recipient device and/or other similar recipient device(s)).

In one or more embodiments, the suggested document modifications can include counters or proposals for modifying the digital document, changes based on past similar documents (e.g., contracts), and redlining tools to directly modify a digital document. Furthermore, as part of the suggested document modifications, the intelligent document system can further provide safety/legitimacy scores to indicate a similarity with past digital documents and whether the past digital documents were signed. In some embodiments the intelligent document system further provides features to streamline the process of completing the digital document such as highlighting portions that differ from past contracts, providing commonly asked questions regarding a digital document, and/or filling out all placeholder fields with the selection of a single element within the interface. Accordingly, in some such instances, by providing a variety of smart suggestion features, the intelligent document system streamlines the process of iterating modifications of a digital document between a requestor device and a recipient device.

As suggested above, the intelligent document system can provide several improvements or advantages over existing computing systems within the digital signature space. For example, the intelligent document system can provide improved efficiency. For instance, the intelligent document system eliminates excessive user interactions from a requestor shuffling between multiple different user interfaces and/or applications to obtain relevant content for generating a digital document. To illustrate, the intelligent document system integrates the large language model with the content management system that stores content items (e.g., additional digital documents) to generate digital documents responsive to a requestor device's digital text prompts.

Moreover, in some embodiments the intelligent document system provides the option for the requestor device to send digital text prompts via the document creation interface and further receives the generated digital document within the document creation interface. As such, the intelligent document system generates the digital document in response to a digital text prompt without requiring a user to navigate to a different interface or application.

Furthermore, in some embodiments, the intelligent document system further eliminates excessive interactions by providing an indication of the digital document as a selectable content item (e.g., a selectable PDF file) for display in the document creation interface. Moreover, in some embodiments the intelligent document system further allows a user to directly send the digital document to a recipient device from the document creation interface. Accordingly, in some such embodiments, the requestor device can select the indication to view/send the digital file directly in the document creation interface.

Additionally, in some embodiments the intelligent document system, via the document creation interface, further improves upon inefficiencies of conventional systems. For instance, the intelligent document system allows requestor devices to make multiple iterations all within the same interface and receive modifications to the digital document also within the same interface. Moreover, in some embodiments, the intelligent document system further allows recipient devices to review and modify the digital document all within the document review interface. Accordingly, in some such embodiments, the intelligent document system streamlines the efficiency across creating the document and reviewing the document. Specifically, the intelligent document system can streamline the efficiency by integrating the content management system and the large language model with the document creation interface and the document review interface.

In addition to the efficiency improvements, in one or more embodiments, the intelligent document system further improves accuracy of conventional systems. For example, the intelligent document system extracts and uses specific latent features that define context for generating various suggestions and outputs (e.g., scores) to improve the document creation and the document review process. For instance, the intelligent document system draws upon data from the content management system (e.g., content items specific to a computing device/user account) to tailor suggestions for modification to improve the document creation and/or review process. Specifically, the intelligent document system generates suggestions that are specific to the context of the generated digital document (e.g., generated from the large language model) to streamline and improve the accuracy and comprehensibility of the content within the document.

Moreover, in addition to the efficiency improvements, in one or more embodiments, the intelligent document system further improves security of conventional systems. In one or more embodiments, the intelligent document system utilizes a large language model isolated from third-party models. In other words, the intelligent document system can utilize a large language model trained in part on data provided by the intelligent document system (e.g., from content items in the content management system) to prevent leakage of confidential or sensitive information to third-party models.

Relatedly, in one or more embodiments, the intelligent document system further improves the flexibility of conventional systems. For instance, in contrast to conventional systems, the intelligent document system incorporates a seamless integration of the digital signature workflow. In some such instances, the intelligent document system receives requestor input prompts, generates a digital document, sends the digital document to a recipient device, and allows for additional modifications/iterations—all within the document creation interface and the document review interface. Moreover, in some embodiments the intelligent document system further provides various scores to improve the creation and modification of digital documents.

As illustrated by the foregoing discussion, the present disclosure utilizes a variety of terms to describe features and benefits of the intelligent document system. Additional detail is hereafter provided regarding the meaning of these terms as used in this disclosure. In one or more embodiments, "a digital text prompt" refers to a message or instruction provided in a textual form to guide the intelligent document system in generating a digital document. For instance, the intelligent document system receives the digital text prompt from the requestor device for generating a digital document, for modifying a digital document, or for providing information regarding a generated digital document. Moreover, in some instances the digital text prompt includes a non-first order text prompt, while in other instances the text prompt includes a multi-order text prompt. For instance, a multi-order text prompt includes a prompt such as "generate an employment contract and tell me what the longest clause of the contract is."

As mentioned above, the intelligent document system receives digital text prompts from a requestor device. In one or more embodiments, "a requestor device" refers to a computing device that requests content from an additional computing device. For example, in some instances the requestor device requests a digital signature for a document. Further, in some embodiments the requestor device prepares a document to send via the intelligent document system to the additional computing device to obtain content and/or a digital signature. Moreover, in the digital signature workflow, the requestor device helps mediate obtaining multiple signatures, thus a requestor device can send out many different requests to different computing devices to obtain content and/or a digital signature.

Moreover, as mentioned, the requestor device is associated with a user account. In one or more embodiments, "a user account" refers to an account associated with the requestor device. For example, a user account includes a digital account for managing certain operations. For instance, the user account associated with the requestor device manages operations such as obtaining a digital signature. Furthermore, the intelligent document system associates the user account with a content management system, such that the user account can access content items within the content management system. Moreover, in some embodiments when the user account associated with the requestor device sends a signature request, the recipient device receives an indication of the signature request coming from the user account.

In some embodiments, the intelligent document system 102 includes or refers to a machine learning model (e.g., in context of the large language model, in some embodiments, the intelligent document system 102 utilizes a general machine learning model trained for natural language tasks). In one or more embodiments a "machine learning model" includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness. Example machine learning models include various types of decision trees, support vector machines, Bayesian networks, random forest models, or neural networks (e.g., deep neural networks).

Similarly, a "neural network" includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components.

Further, the intelligent document system utilizes a large language model to generate a digital document. In one or more embodiments, the term "large language model" includes or refers to one or more neural networks capable of processing natural language text to generate outputs that range from predictive outputs, analyses, or combinations of data within stored content items. In particular, a large language model can include parameters trained (e.g., via deep learning) on large amounts of data to learn patterns and rules of language for summarizing and/or generating digital content. Examples of large language model include BLOOM, Bard AI, ChatGPT, LaMDA, DialoGPT, Drop-boxGPT, and Dropbox FileGPT. In one or more embodiments, the intelligent document system 102 utilizes various iterations of general language machine learning models trained for natural language tasks.

As mentioned, the intelligent document system utilizes the large language model to generate the digital document. In one or more embodiments, "a digital document" refers to a digital representation of information, data, or content. For example, a digital document can be viewed, edited, and transmitted by using computing devices. Moreover, the disclosed system stores the digital document in file formats such as a PDF, DOCX, XLSX, and HTML.

Moreover, in some embodiments the intelligent document systems accesses content items from the content management system. In one or more embodiments, as used herein, the term "content item" (or simply "content item") refers to a digital object or a digital file that includes information interpretable by a computing device (e.g., a client device) to present information to a user. A content item can include a file such as a digital text file, a digital image file, a digital audio file, a webpage, a website, a digital video file, a web file, a link, a digital document file, or some other type of file or digital object. A content item can have a particular file type or file format, which may differ for different types of digital content items (e.g., digital documents. digital images, digital videos, or digital audio files). In some cases, a content item can refer to a remotely stored (e.g., cloud-based) item or a link (e.g., a link to a cloud-based item or a web-based content item) and/or a content clip that indicates (or links) a discrete selection or segmented sub-portion of content from a webpage or some other content item or source. A content item can be editable or otherwise modifiable and can also be sharable from one user account (or client device) to another. In some cases, a content item is modifiable by multiple user accounts (or client devices) simultaneously and/or at different times.

Additional detail regarding the intelligent document system will now be provided with reference to the figures. For example, FIG. 1 illustrates a schematic diagram of an example system environment for implementing an intelligent document system 102 in accordance with one or more implementations. An overview of the intelligent document system 102 is described in relation to FIG. 1. Thereafter, a more detailed description of the components and processes of the intelligent document system 102 is provided in relation to the subsequent figures.

As shown, the environment includes server(s) 104 with a digital signature system 106 that includes the intelligent document system 102. Further, the server(s) 104 include a content management system 108, a database 110, and optionally, a large language model 112. Moreover, FIG. 1 shows server(s) 116 that further contains a large language model 114. Each of the components of the environment can communicate via the network 118, and the network 118 may be any suitable network over which computing devices can communicate. Example networks are discussed in more detail below in relation to FIGS. 16-17.

As shown in FIG. 1, the example environment includes client device 120. The client device 120 can be one of a variety of computing devices, including a smartphone, a tablet, a smart television, a desktop computer, a laptop computer, a virtual reality device, an augmented reality device, or another computing device as described in relation to FIGS. 17-18. The client device 120 can communicate with the server(s) 104 and/or the server(s) 116 via the network 118. For example, the client device 120 can receive user input from a user interacting with the client device 120 (e.g., via a client application 122) to, for instance, generate a digital text prompt, generate a digital document, modify a digital document, send a digital document, or to select user interface elements for interacting with the content management system 108 (e.g., for indicating the content items for generating the digital document). In addition, the intelligent document system 102 on the server(s) 104 can receive information relating to various interactions with content items and/or user interface elements based on the input received by the client device 120.

Moreover, the client device 120 and as also shown, a client device 124 can represent a requestor computing device and/or a recipient computing device (e.g., a signor recipient device). In some instances, the client device 120 represents a requestor computing device. In some such instances, the client device 120 sends the digital signature request to the intelligent document system 102 for which the intelligent document system 102 sends to the client device 124 (e.g., which represents the signor recipient device). In some such instances the client device 124 via the client application 126 can sign or modify the digital document and send the completed digital document or various modifications back to the client device 120. Although FIG. 1 shows the client device 120 and the client device 124, in one or more implementations the environment of the intelligent document system 102 includes additional client devices.

As shown, the client device 120 can include the client application 122. In particular, the client application 122 may be a web application, a native application installed on the client device 120 (e.g., a mobile application, a desktop application, etc.), or a cloud-based application where all or part of the functionality is performed by the server(s) 104. Based on instructions from the client application 122, the client device 120 can present or display information, including a user interface for interacting with (or collaborating regarding) generating context engine outputs. Using the client application 122, the client device 120 can perform (or request to perform) various operations, such as inputting a digital text prompt, selecting one or more content items and/or generating a digital document.

As illustrated in FIG. 1, the example environment also includes the server(s) 104. The server(s) 104 may generate, store, process, receive, and transmit electronic data, such as text queries, computer code, interactions with interface elements, and/or interactions between user accounts or client devices. For example, the server(s) 104 may receive an indication from the client device 120 of a user interaction defining a text query. In addition, the server(s) 104 can transmit data to the client device 120 in the form of a data packet response to the digital text prompt. Indeed, the server(s) 104 can communicate with the client device 120 to send and/or receive data via the network 118. In some implementations, the server(s) 104 comprise(s) a distributed server where the server(s) 104 include(s) a number of server devices distributed across the network 118 and located in different physical locations. The server(s) 104 can comprise one or more content servers, application servers, container orchestration servers, communication servers, web-hosting servers, machine learning server, and other types of servers.

As shown in FIG. 1, the server(s) 104 can also include the intelligent document system 102 as part of the digital signature system 106. The intelligent document system 102 interacts with the digital signature system 106 by sending digital documents to one or more recipient devices. Further, in some instances the intelligent document system 102 utilizes the digital signature system 106 to transmit notifications and messages to recipient devices and further sends reminder notifications to recipient devices. Moreover, in some embodiments the digital signature system 106 receives a completed (e.g., signed) digital document from one or more recipient devices. In some such instances, the digital signature system 106 further interacts with the intelligent document system 102 to provide the signed digital document.

As shown in FIG. 1, the server(s) 104 further contains the content management system 108. The content management system 108 can communicate with the client device 120 to perform various functions associated with the client application 122 such as managing user accounts, selecting/suggesting content items to utilize for generating a digital document, surfacing latent features of content items for the intelligent document system 102 to generate various scores and/or providing recommendations for content items for a user of the client application 122 to utilize. Indeed, the content management system 108 can include a network-based smart cloud storage system to manage, store, and maintain content items and related data across numerous user accounts. In some embodiments, the intelligent document system 102 and/or the content management system 108 utilize the database 110 to store and access information such as content items, previously generated digital documents, digital text prompts, generative LLM responses, and other information related to the intelligent document system 102 performing various acts for digital document creation and review.

Moreover, as shown in FIG. 1, in some embodiments the server(s) 104 further contains the large language model 112. For instance, in some such embodiments, the large language model consists of a privately trained large language model (e.g., an in-house large language model). In other words, the large language model 112 does not potentially expose or leak confidential/sensitive information to third party applications. For instance, the digital signature system 106, the intelligent document system 102, the content management system 108, and the client device 120 interact with the large language model 112 without suffering from data leakage due to the large language model 112 being implemented within the server(s) 104.

As further illustrated, the environment includes the server(s) 116 that hosts a large language model 114. In particular, the large language model 114 communicates with the server(s) 104 and the client device 120. For example, the intelligent document system 102 provides digital text prompts received from the client device 120 to the large language model 114, where the digital text prompts can indicate specific content items within the database 110 and other document parameters for generating a digital document. Indeed, the large language model 114 can include a machine learning model powered by neural networks or other machine learning architectures for generating responses to digital text prompts. For example, the large language model 114 can refer to a ChatGPT model that generates HTML structured responses for the intelligent document system 102 to further create a digital file.

Although FIG. 1 depicts the intelligent document system 102 located on the server(s) 104, in some implementations, the intelligent document system 102 may be implemented by (e.g., located entirely or in part on) one or more other components of the environment. For example, the intelligent document system 102 may be implemented by the client device 120 and/or a third-party system. For example, the client device 120 and/or a third-party system can download all or part of the intelligent document system 102 for implementation independent of, or together with, the server(s) 104.

In some implementations, though not illustrated in FIG. 1, the environment may have a different arrangement of components and/or may have a different number or set of components altogether. For example, the client device 120 may communicate directly with the intelligent document system 102, bypassing the network 118. The environment may also include one or more third-party systems. In addition, the environment can include additional storage databases located external to the server(s) 104 (e.g., in communication via the network 118) or located on the server(s) 116 and/or on the client device 120.

Figure 2:
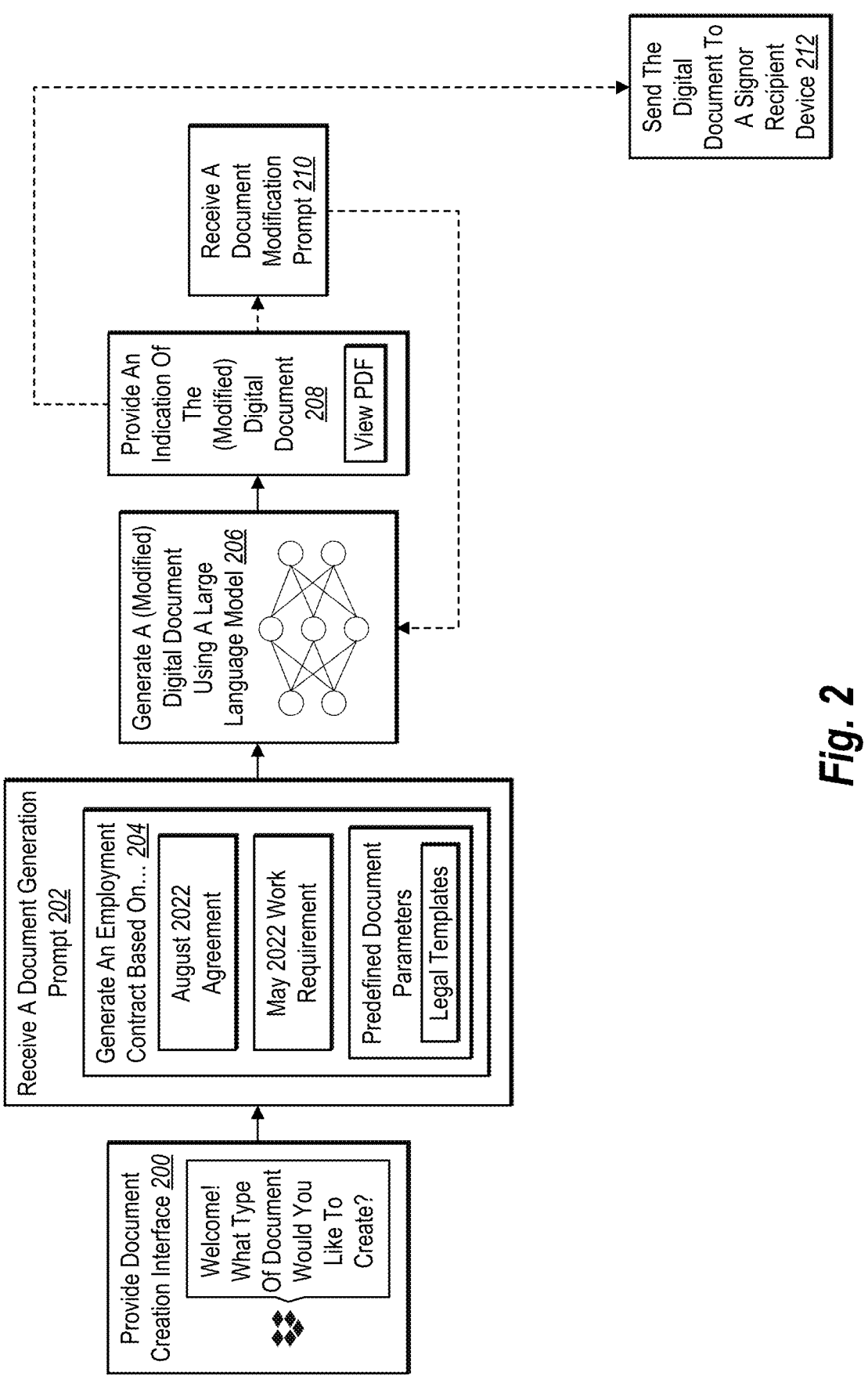
FIG. 2 illustrates an example overview of the intelligent document system generating a digital document based on a digital text prompt and sending the digital document to a recipient device in accordance with one or more embodiments.

As mentioned above, the intelligent document system 102 generates a digital document based on a digital text prompt and sends the digital document to a recipient device. FIG. 2 illustrates an overview of the intelligent document system 102 utilizing a large language model to generate a digital document in accordance with one or more embodiments.

For example, FIG. 2 shows the intelligent document system 102 performing an act 200 of providing a document creation interface. In one or more embodiments, "a document creation interface" refers to a software application interface to facilitate the creation, modification, and formatting of digital documents. For instance, the intelligent document system 102 provides the document creation interface for a requestor device to generate text documents, documents with text and images, spreadsheets, presentations (e.g., PowerPoint), and graphics. To illustrate, the intelligent document system 102 provides in the document creation interface, an input field for entering digital text prompts to generate and modify digital documents. In other words, the intelligent document system 102 provides different iterations of the document creation interface. In some instances, the intelligent document system 102 provides a document creation interface for generating digital documents, and in some instances, the intelligent document system 102 provides an additional document creation interface for modifying digital documents. Accordingly, in some embodiments the intelligent document system 102 provides the document creation interface to the requestor device to generate/modify digital documents with digital signature placeholder fields.

As mentioned above, the document creation interface includes an input field for entering a variety of inputs. For instance, the input field includes the intelligent document system 102 receiving voice commands, tactile inputs (e.g., a selection of one or more elements suggested by the intelligent document system 102), biometric inputs, motion inputs, gesture inputs, and text inputs (e.g., via a text field). In one or more embodiments, "a text field" refers to a graphical or input element for a requestor device to input or edit textual input information. For instance, the intelligent document system 102 provides the text field for entering text prompts, accordingly the text field provides an input field for instructing the intelligent document system 102 to generate a specific type of digital document.

As shown in FIG. 2, the intelligent document system 102 via the document creation interface can provide a welcome message to the requestor device. For instance, the welcome message can read "Welcome! What type of document would you like to create?" As is described and shown in further detail below, the requestor device can input a digital text prompt within the document creation interface in response to the welcome message.

As shown in FIG. 2, the intelligent document system 102 further performs an act 202 of receiving a document generation prompt. In one or more embodiments, "a document generation prompt" refers to a specific prompt for generating a digital document. For instance, a document generation prompt includes instructing the intelligent document system 102 to generate an employment contract (employment agreement, non-compete, non-disclosure, independent contractor), a business contract (e.g., partnership agreement, sales contract, supply contract, confidentiality agreement), a real estate contract (e.g., a purchase agreement, lease agreement, etc.), an intellectual property contract, a construction contract, a service contract, etc. Moreover, in some embodiments the document generation prompt includes instructing the intelligent document system 102 to generate a school field trip form, a class syllabus, and a collaboration document (e.g., containing text and image fields). Further, in some embodiments the document generation prompt includes a specific indication of a type of digital document, a format of the digital document, and can also include requirements to include within the digital document (e.g., relocation bonus, base salary, paid time off, etc.).

For instance, as shown in FIG. 2, the intelligent document system 102 receives a document generation prompt 204 that reads "generate an employment contract based on . . . " As is further shown, the document generation prompt 204 indicates the employment contract to be based on "an August 2022 agreement," "a May 2022 work requirement," and "predefined document parameters," which further includes legal templates.

To illustrate, in one or more embodiments, the intelligent document system 102 utilizes the predefined document parameters to guide the formatting and structure of generating a digital document. For instance, the intelligent document system 102 utilizes predefined document parameters that include legal templates to generate legal instruments (e.g., contracts) accurately and efficiently. Further, the intelligent document system 102 stores a database of legal instruments that have been previously used by other entities in various types of transactions, and in some instances, legal instruments that have been tested in a court of law (e.g., legally binding). Moreover, in some embodiments, the intelligent document system 102 provides the database of legal templates to a user to select from. For instance, the intelligent document system 102 provides the database with different categories of legal instruments and allows a user to select a certain category of legal instrument (e.g., business contract, employment contract, sales contract, etc.) and a specific template (e.g., employment contract in the food industry, etc.). In some embodiments, the selection of the certain category and the specific template allows the intelligent document system 102 to further refine the generation of the digital document (e.g., refined for legal accuracy).

Moreover, as shown in FIG. 2, the intelligent document system 102 performs an act 206 of generating a document using a large language model. As mentioned previously, the intelligent document system 102 provides the document generation prompt 204 to a large language model. For example, a large language model includes artificial intelligence models capable of processing and generating natural language text. In particular, large language models are trained on large amounts of data to learn patterns and rules of language. As such, large language models post-training is capable of generating text similar in style and content to input data.

Furthermore, as shown in FIG. 2, the intelligent document system 102 performs an act 208 of providing an indication of the digital document. For instance, as shown in FIG. 2, the intelligent document system 102 provides the indication of the digital document as a selectable element. To illustrate, FIG. 2 shows "View PDF" as the selectable element. As is described in further detail below, selecting the element causes the graphical user interface of the requestor device to display the digital document.

As also shown in FIG. 2, in some embodiments the intelligent document system 102 performs an act 210 of receiving a document modification prompt. In one or more embodiments, "a document modification prompt" refers to a specific prompt for modifying a digital document. For instance, the document modification prompt includes instructing the intelligent document system 102 to add content (e.g., text or an image) within a digital document, to remove content from the digital document, or to re-generate the digital document based on various content items. Accordingly, the requestor device utilizing a document modification prompt allows for an iterative process of refining a digital document.

As shown, in some such embodiments where the intelligent document system 102 performs the act 210 of receiving the document modification prompt, the intelligent document system 102 additionally performs the act 206 of generating the document using a large language model. However, in some such instances the intelligent document system 102 generates a modified digital document based on the document modification prompt. As shown, after the intelligent document system 102 performs the act 206 in response to the act 210, the intelligent document system 102 further performs the act 210 of providing an indication of the modified digital document.

In some embodiments, the intelligent document system 102 further performs the act 210 of receiving a document modification prompt. In other words, the intelligent document system 102 can receive additional iterations via the document modification prompt to generate a modified digital document. In some embodiments, rather than the intelligent document system 102 receiving a document modification prompt or additional document modification prompts, the intelligent document system 102 performs an act 212 of sending the digital document to a signor recipient device.

In one or more embodiments, "a signor recipient device" refers to a computing device that receives requests for content from a requestor device via the intelligent document system 102. For example, in some instances the signor recipient device receives a digital document from a requestor device via the intelligent document system 102 to sign the digital document. To illustrate, a signor recipient device includes one who signs or executes a document, agreement, contract or another written or legal instrument. Further, in some embodiments the signor recipient device proposes modifications to a digital document and sends the digital document back to the requestor device. Moreover, in the digital signature workflow, the signor recipient device controls when the task is completed (e.g., by signing the digital document).

Figure 3A:
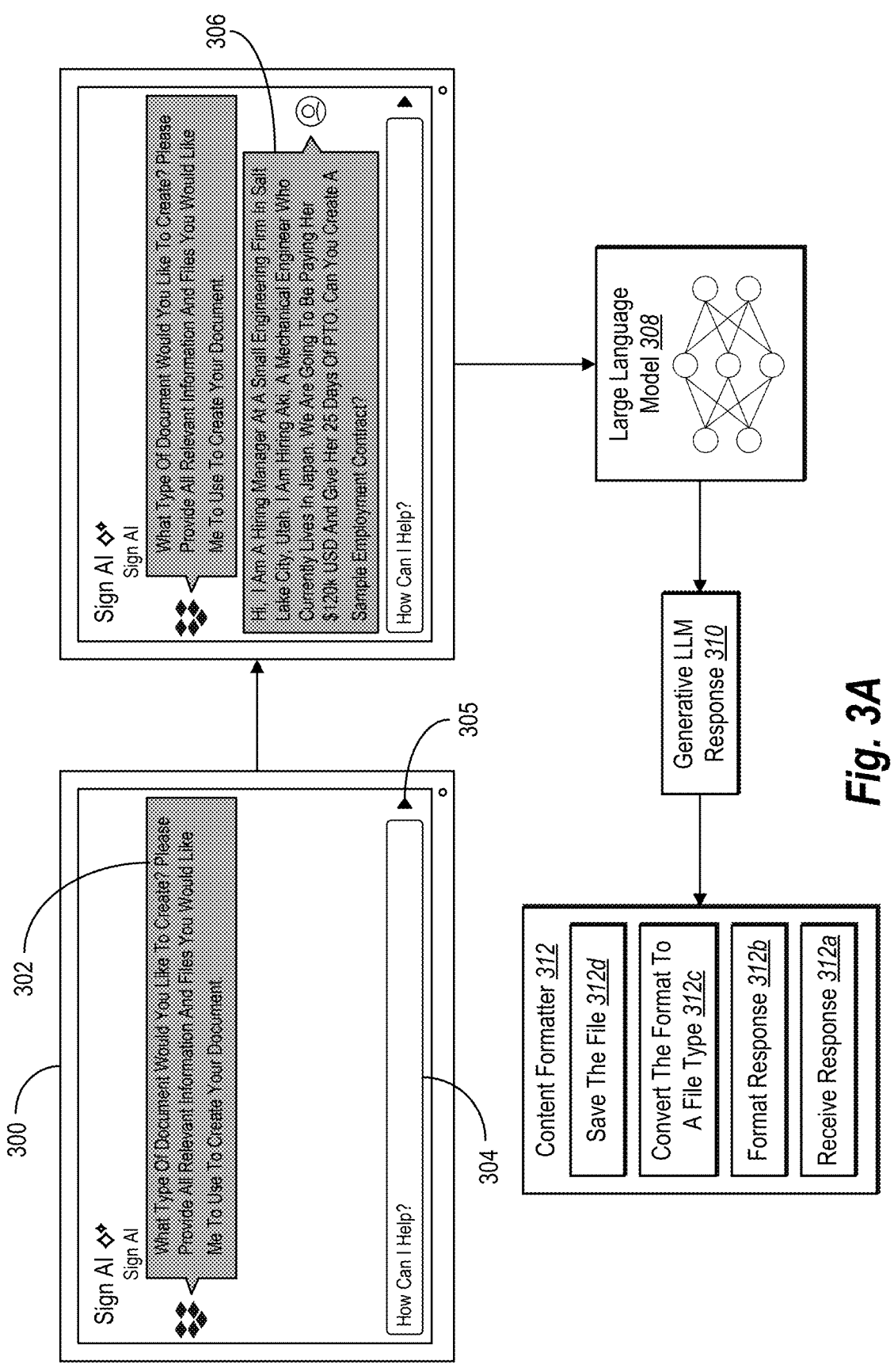
FIGS. 3A-3B illustrate example diagrams of the intelligent document system providing the document creation interface and generating a response to a digital text prompt via a large language model in accordance with one or more embodiments.

As mentioned above, the intelligent document system 102 provides the document creation interface to the requestor device to receive digital text prompts. FIG. 3A illustrates the intelligent document system 102 receiving a digital text prompt and sending the digital text prompt to a large language model in accordance with one or more embodiments. For example, FIG. 3A shows a document creation interface 300 presenting a message 302 to the requestor device. Specifically, FIG. 3A shows the message 302 reading "what type of document would you like to create? Please provide all relevant information and files you would like me to use to create your document." As shown in FIG. 3A, the intelligent document system 102 further provides a text field 304 for the requestor device to input a digital text prompt. In instances where the requestor device enters a digital text prompt, the requestor device can further select a send element 305 to send the digital text prompt to the intelligent document system 102 via the document creation interface 300.

As shown in FIG. 3A, the intelligent document system 102 further receives a document generation prompt 306 from the requestor device. As shown in FIG. 3A, the document generation prompt 306 reads "Hi, I am a hiring manager at a small engineering firm in Salt Lake City, Utah. I am hiring Aki, a mechanical engineer who currently lives in Japan. We are going to be paying her $120K USD and give her 25 days of PTO. Can you create a sample employment contract?"

As shown, the intelligent document system 102 receives the document generation prompt 306 via the document creation interface 300 and further sends the document generation prompt 306 to a large language model 308. In some embodiments, the intelligent document system 102 sends the document generation prompt 306 and document parameters to the large language model 308.

For example, "document parameters" refer to specific characteristics or attributes of a digital document. Further, in some embodiments the document parameters define the structure and format of a digital document. For instance, the document parameters include information such as page size, page orientation, margins, font type and size, line spacing, character and paragraph formatting, headers/footers, a document language, a color scheme, a document structure, a table of contents, etc. In some such instances, the intelligent document system 102 standardizes the document parameters to send along with text prompts.

Moreover, in some embodiments, the document parameters further include information specified in a text prompt (e.g., include a relocation bonus, include visa sponsorship information, include a salary of 120K, include a twenty five paid days off, etc.). In other words, the document parameters are part of the document generation prompt 306.

In one or more embodiments, the intelligent document system 102 intelligently selects document parameters based on the type of document (e.g., contract, class syllabus, etc.). For instance, the intelligent document system 102 has predefined document parameters regarding page size, page orientation, margins, font type and size, line spacing, character and paragraph formatting, headers/footers, a document language, a color scheme, a document structure for an employment contract and different predefined document parameters for a business contract. In some instances, the intelligent document system 102 trains a machine learning model to generate predefined document parameters. To illustrate, the intelligent document system 102 trains a machine learning model on tagged digital documents to extract document parameters and to generate predicted document parameters.

As further shown in FIG. 3A, the intelligent document system 102 via the large language model 308 generates a generative LLM response 310, responsive to the document generation prompt 306. For example, the generative LLM response 310 includes the large language model 308 generating a HyperText Markup Language (HTML) output according to the document parameters and the document generation prompt 306. For instance, the generative LLM response 310 includes a series of elements represented by tags that define different parts of the digital document (e.g., headings, paragraphs, links, images, text styles, etc.).

Furthermore, as shown in FIG. 3A, the intelligent document system 102 receives the generative LLM response 310 via a content formatter 312. For example, the content formatter 312 performs an act 312a of receiving the generative LLM response 310, performs an act 312b of formatting the generative LLM response 310 according to the HTML output, performs an act 312c of converting the formatted response to a file type (e.g., a PDF file) and further performs an act 312d of saving the digital document file. In other words, the intelligent document system 102 utilizes the content formatter 312 to receive the generative LLM response 310 and convert it to a PDF file.

As just mentioned, the intelligent document system 102 saves the digital document as a file. In some instances, the intelligent document system 102 saves the digital document as a file within a document creation database. For instance, the document creation database can include a database part of the intelligent document system 102 that stores files with a corresponding identifier that points to a user account of a requestor device. In some instances, the intelligent document system 102 saves the digital document as a file within the database of the content management system (e.g., the content management system 108 and the database 110). As shown in FIG. 3A and as is discussed in further detail below, the intelligent document system 102 via the content formatter 312 provides the digital document as a file to the document creation interface 300.

Figure 3B:
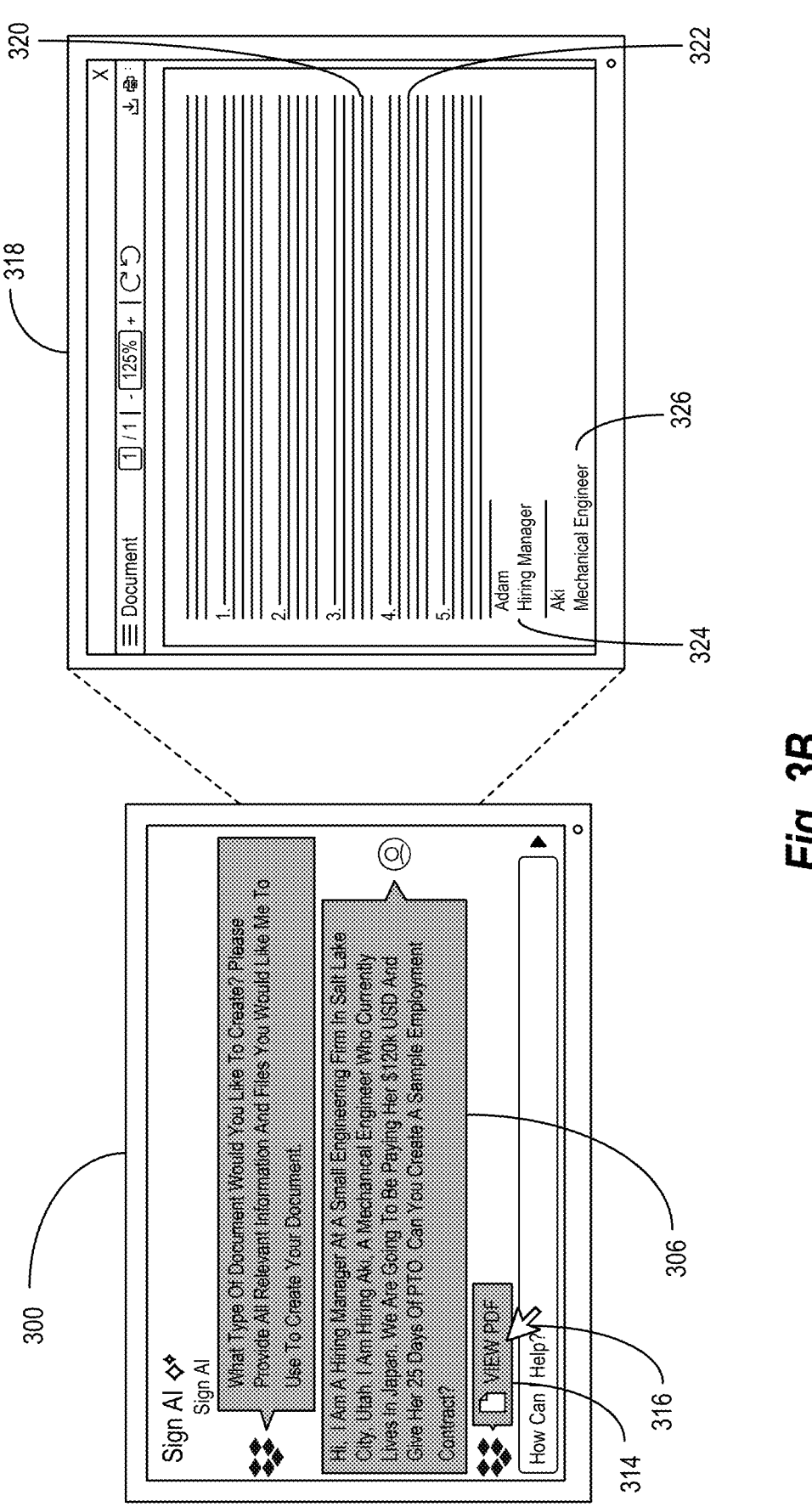

As mentioned above, the intelligent document system 102 provides the digital document generated by the large language model and converted to a file type to the document creation interface. FIG. 3B illustrates the intelligent document system 102 providing an indication of the digital document and further showing a selection of the indication in accordance with one or more embodiments.

For example, FIG. 3B shows the intelligent document system 102 providing within the document creation interface 300 an indication 314 of the digital document. Specifically, the indication 314 reads "View PDF," which indicates to the requestor device a selectable element responsive to the document generation prompt 306. Furthermore, FIG. 3B shows a selection 316 of the indication 314 which causes the graphical user interface to transition from the document creation interface 300 to a file view 318. In particular, the file view 318 shows the contents of the digital document.

As a reminder, the document generation prompt 306 reads "Hi, I am a hiring manager at a small engineering firm in Salt Lake City, Utah. I am hiring Aki, a mechanical engineer who currently lives in Japan. We are going to be paying her $120K USD and give her 25 days of PTO. Can you create a sample employment contract?" Accordingly, the file view 318 shows the digital document that shows clauses that are responsive to the document generation prompt 306.

For instance, a third clause 320 (e.g., responsive to the salary requirement) in the file view 318 could read "The Company shall pay the Employee a salary of $120,00 USD per annum, payable in accordance with the Company's standard payroll procedures. The annual salary will be subject to review and adjustment from time to time." Further, in some embodiments a fourth clause 322 (e.g., responsive to the paid time off requirement) could read" The Employee shall be entitled to 25 days of paid time off (PTO) each calendar year. The Employee will also be eligible to participate in any and all benefit programs that the Company establishes and makes available to its employees from time to time." Moreover, as shown, the file view 318 further shows a first signature placeholder field 324 and a second signature placeholder field 326.

Although, the above description discusses the selection 316 of the indication 314 which causes the graphical user interface to transition from the document creation interface 300 to the file view 318, in one or more embodiments, the intelligent document system 102 does not provide the indication 314 to the user, rather the intelligent document system 102 automatically shows the file view 318 in response to creating the digital document. In some embodiments, the intelligent document system 102 allows a user to configure settings associated with the document creation interface 300, which indicate whether the intelligent document system 102 should provide the indication 314 or automatically show the file view in response to creating the digital document.

Figure 4A:
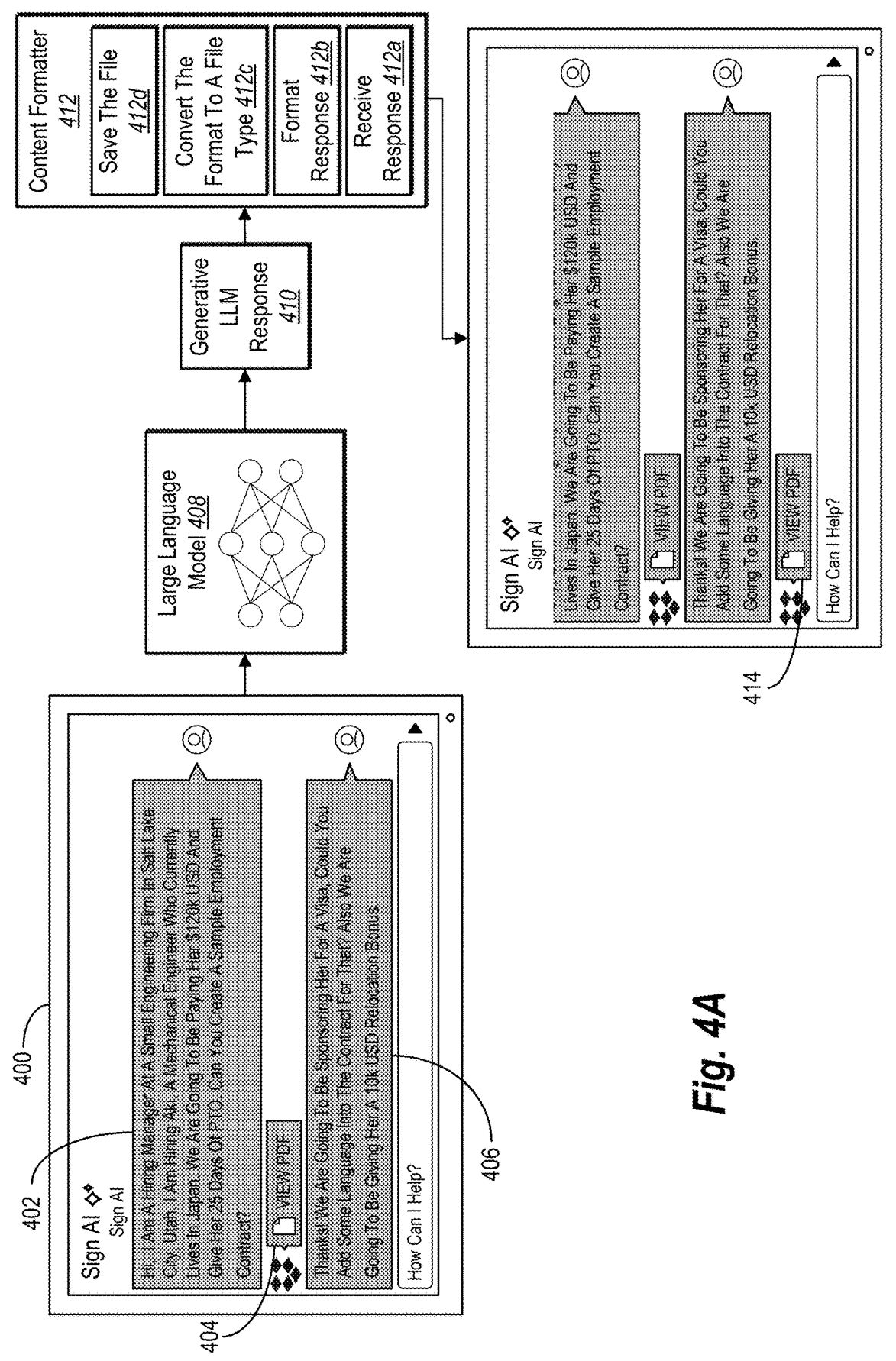
FIGS. 4A-4B illustrate an example diagram of the intelligent document system receiving a document modification prompt in accordance with one or more embodiments.

As mentioned above, the intelligent document system 102 receives document modification prompts to modify the digital document. FIG. 4A illustrates the intelligent document system 102 receiving from the requestor device a document modification prompt via the document creation interface in accordance with one or more embodiments.

For example, FIG. 4A shows a document creation interface 400, a document generation prompt 402, and an indication 404 of the digital document (discussed above). In addition, FIG. 4A further shows a document modification prompt 406. For instance, FIG. 4A shows the document modification prompt 406 that reads "Thanks! We are going to be sponsoring her for a visa. Could you add some language into the contract for that? Also, we are going to be giving her a 10K USD relocation bonus."

Similar to the description above in FIG. 3A, the intelligent document system 102 receives the document modification prompt 406 along with document parameters and sends the document modification prompt 406 along with the document parameters to a large language model 408. Furthermore, as shown, the intelligent document system 102 utilizes the large language model 408 to generate a generative LLM response 410, responsive to the document modification prompt 406. As discussed above, the intelligent document system 102 further utilizes a content formatter 412 to perform an act 412a of receiving the generative LLM response 410, an act 412b of formatting the generative LLM response 410, an act 412c of converting the generative LLM response 410 to a file and an act 412d of saving the file. Moreover, as shown, the intelligent document system 102 provides an indication 414 of the modified digital document in the document creation interface 400.

Figure 4B:
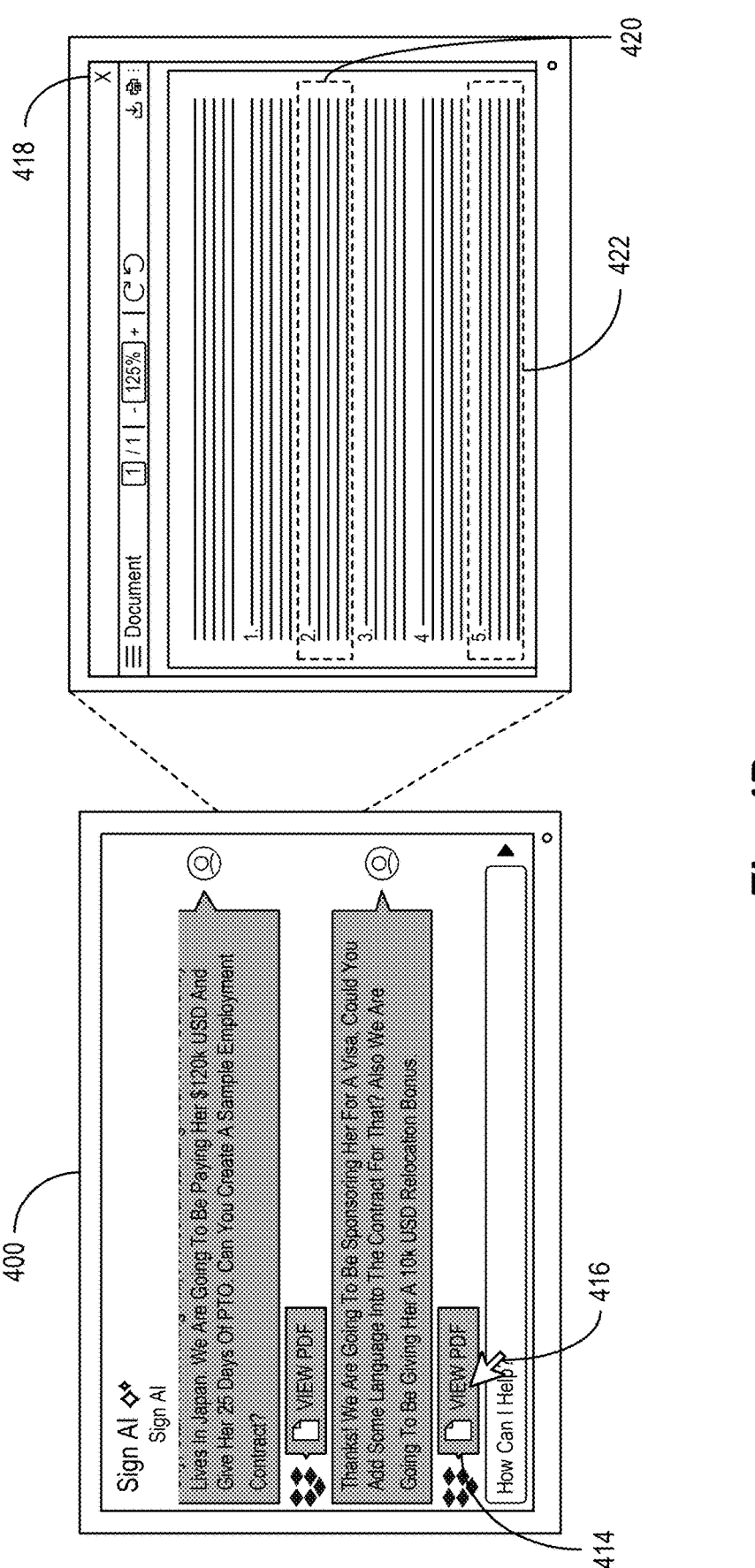

FIG. 4B illustrates a selection of the indication of the modified digital document and showing the modified digital document in accordance with one or more embodiments. For example, FIG. 4B shows the document creation interface 400 with the indication 414 of the modified digital document. Further, FIG. 4B shows a selection 416 of the indication 414 to view the modified digital document.

As shown in FIG. 4B, in response to the selection 416 of the indication 414, the intelligent document system 102 causes the graphical user interface to transition from the document creation interface 400 to a file view 418. For instance, as shown, the file view 418 shows the modified digital document. Specifically, the file view 418 shows for example the modified portions of the digital document responsive to the document modification prompt 406. To illustrate, a second clause 420 can include a modification to the digital document that indicates changes regarding sponsorship for a visa. For instance, the second clause 420 can read "The Company agrees to sponsor the Employee for an Hi-b visa as required for the Employee to legally work in the United States. The Company will bear all reasonable costs and fees associated with the visa application process."

Moreover, a fifth clause 422 can include a modification to the digital document that indicates the relocation bonus. For instance, the fifth clause 422 can read "The Company shall provide a one-time relocation bonus of $10,000 USD, payable within 30 days of the Employee's start date, to assist with relocation expenses." Furthermore, although FIG. 4B shows an indication of dotted lines around the second clause 420 and the fifth clause 422, in some embodiments the file view 418 does not show the dotted line indications. In some embodiments, the intelligent document system 102 via the file view 418 highlights the modified clauses with a color distinctive from the rest of the digital document to indicate the modifications.

Figure 5:
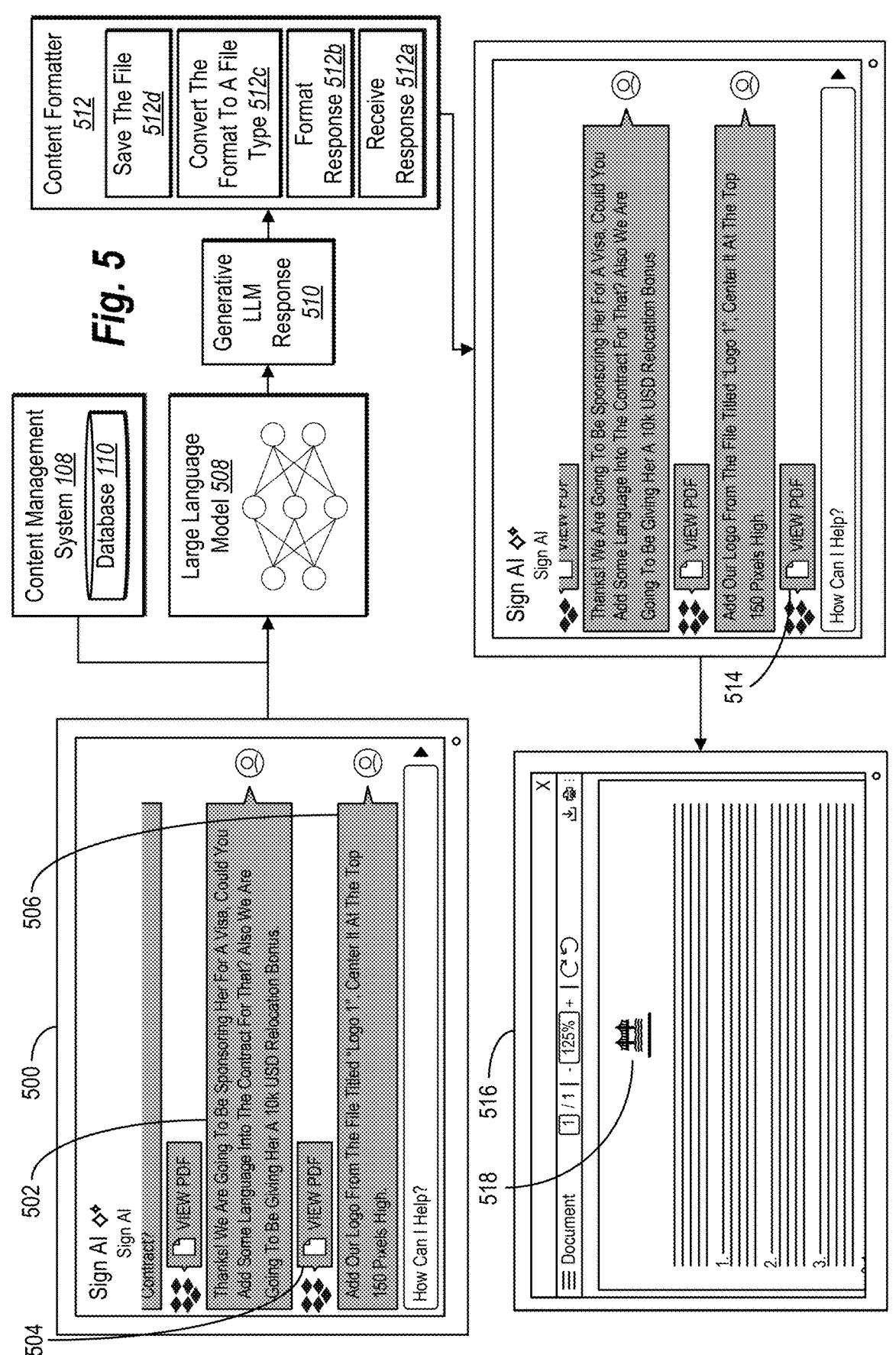
FIG. 5 illustrates an example diagram of the intelligent document system adding content from the content management system to the modified digital document in accordance with one or more embodiments.

As mentioned above, the intelligent document system 102 can utilize content items to further generate the digital documents. FIG. 5 illustrates an additional document modification prompt to add content to the digital document in accordance with one or more embodiments. For example, FIG. 5 shows a document creation interface 500 with a document modification prompt 502, an indication 504 of the modified digital document, and an additional document modification prompt 506. For instance, the additional document modification prompt 506 reads "add our logo from the file titled "Logo 1", center it at the top 150 pixels high."

As shown, the intelligent document system 102 receives the additional document modification prompt 506 and also accesses the database 110 of the content management system 108 and sends the relevant information to a large language model 508. For instance, the intelligent document system 102 sends the information in the additional document modification prompt 506, document parameters, and locates the content item "Logo 1" as stored in the database 110 of the content management system 108.

Furthermore, as shown, the intelligent document system 102 via the large language model 508 generates a generative LLM response 510 and from the generative LLM response 510 the intelligent document system 102 utilizes a content formatter 512. Specifically, as previously discussed, the content formatter 512 performs an act 512a of receiving the generative LLM response 510, an act 512b of formatting the generative LLM response 510, an act 512c of generating a file, and an act 512d of saving the file.

Moreover, as shown, the intelligent document system 102 then provides for display via the document creation interface 500, an indication 514 of the additional modified digital document. Specifically, FIG. 5 shows that in response to a selection of the indication 514, the intelligent document system 102 displays in a file view 516 the additional modified digital document. For instance, the additional modified digital document shows a logo 518 as indicated in the additional document modification prompt 506.

Although not shown in FIG. 5, in one or more embodiments, the intelligent document system 102 utilizes the content formatter 512 to perform the act 512c of generating the file, and further utilizes a computer vision model (e.g., ingests the contents of the digital document, preprocesses any noise or irrelevant details, extracts features such as patterns, shapes, colors, textures, creates a representation of the content, post-processing analysis, and performing one or more actions) to extract various fields within the file. For instance, the intelligent document system 102 extracts the signature field within the file and automatically overlays the signature field within the file with a signature element (e.g., the user does not have to manually overlay the signature portion of the file with a signature field). In other words, the intelligent document system 102 performs property matching and property extraction for a generated digital document.

Moreover, in some embodiments, the intelligent document system 102 performs property matching and property extraction more accurately and efficiently than conventional systems. For instance, due to the intelligent document system 102 possessing millions of digital document templates (sent out and signed) and the above-discussed legal templates, the diversity and volume of ingested template data allows for the intelligent document system 102 to refine the accuracy and efficiency at which various properties of a digital document are identified (e.g., via training various computer vision models (e.g., VGGNet (Visual Geometry Group), ResNet (residual networks), Faster R-CNN (Region-CNN), BERT (Bidirectional encoder representation from transformers), and GPT (generative pre-trained transformer).

Figure 6:
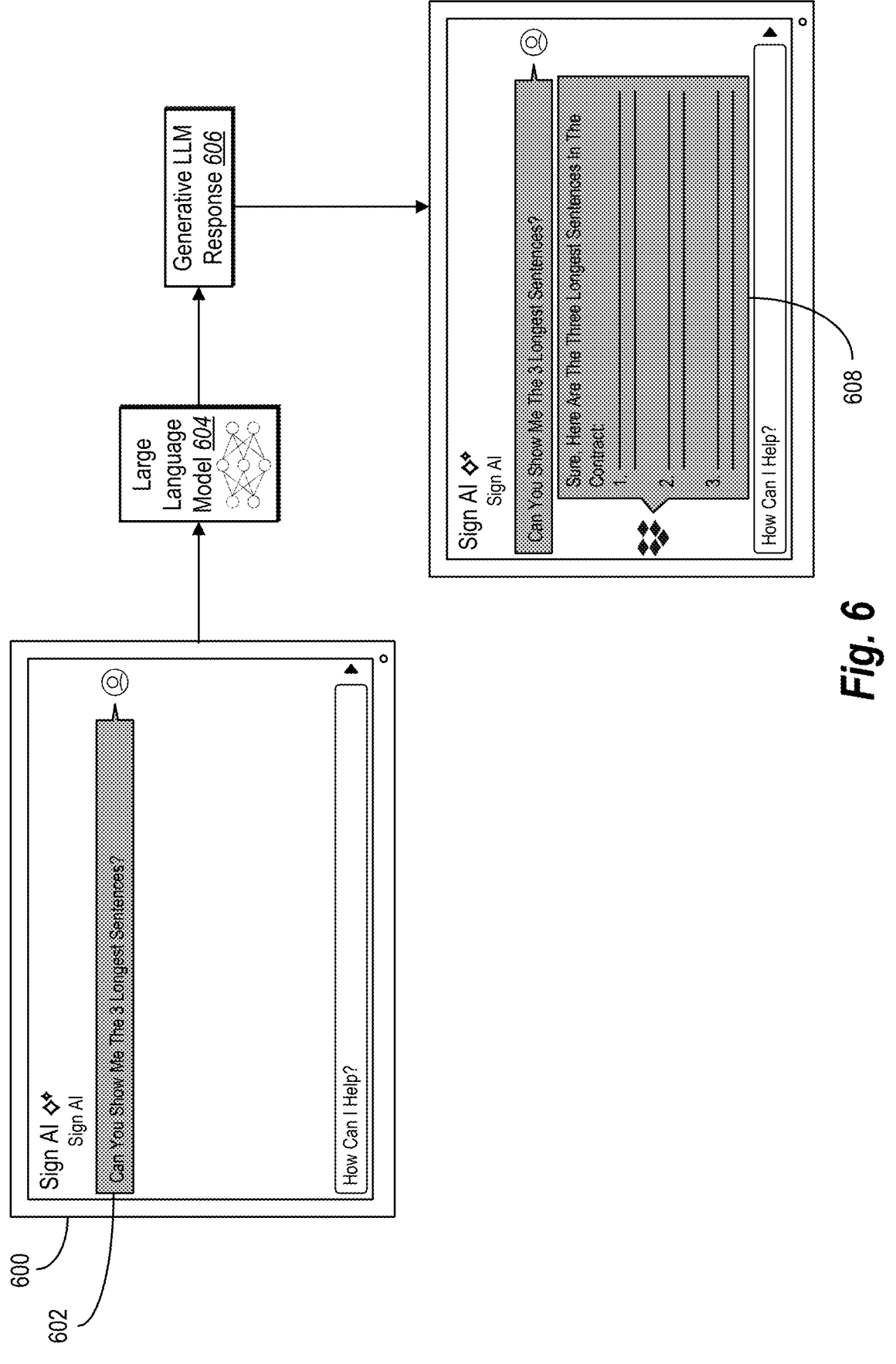
FIG. 6 illustrates an example diagram of the intelligent document system receiving a document information prompt in accordance with one or more embodiments.

As mentioned above, the intelligent document system 102 can also receive document information prompts. FIG. 6 illustrates the intelligent document system 102 receiving a document information prompt and providing a response in accordance with one or more embodiments. In one or more embodiments, "a document information prompt" refers to a specific prompt for obtaining information about a digital document. For instance, the document information prompt includes querying the intelligent document system 102 regarding specific document properties. To illustrate, the document information prompt includes queries pertaining to a length of clauses within the digital document, number of pages, number of words, number of lines, specific numbers, a subject of the digital document, key words/phrases used in the digital document, and a language.

For example, FIG. 6 shows a document creation interface 600 (discussed above) and a document information prompt 602. Specifically, the document information prompt 602 reads "can you show me the 3 longest sentences?" For instance, the document information prompt 602 relates to information in the digital document discussed above in FIG. 5.

As shown in FIG. 6, the intelligent document system 102 sends the document information prompt 602 along with information such as document parameters and the digital document being inquired about to a large language model 604. As shown, the intelligent document system 102 utilizes the large language model 604 to generate a generative LLM response 606. Moreover, as shown, the intelligent document system 102 returns the generative LLM response 606 to the document creation interface 600.

Specifically, as shown, the intelligent document system 102 provides a document information response 608 to the document information prompt 602. For instance, the intelligent document system 102 receives the generative LLM response 606, formats the generative LLM response 606 in a format that conforms with the document creation interface 600 and causes the document creation interface 600 to display the document information response 608. In some embodiments "a document information response" refers to the intelligent document system 102 providing an answer to the document information prompt 602. For instance, in response to a document information prompt 602 querying the intelligent document system 102 for the three longest clauses in the digital document, the intelligent document system 102 provides a document information response 608 that lists the three longest clauses.

To illustrate, the document information response 608 can read "Sure, here are the three longest sentences in the contract: 1. The Company hereby employs the Employee as a Mechanical Engineer, the Employee shall perform such duties as are customarily associated with such position, and other such duties as may be assigned from time to time. 2. The Employee shall be entitled to 25 days of paid time off (PTO) each calendar year, the Employee will also be eligible to participate in any and all benefit programs that the Company establishes and makes available to its employees from time to time. 3. The Company agrees to sponsor the Employee for an Hi-b visa as required for the Employee to legally work in the United States, the Company will bear all reasonable costs and fees associated with the visa application process."

Although not shown in FIG. 6, in one or more embodiments, the intelligent document system 102 can receive additional document information prompts. For instance, the intelligent document system 102 can receive additional prompts regarding summarizing the digital document, the format of the response, the number of words in the digital document, etc. Moreover, in some embodiments the intelligent document system 102 receives additional document modification prompts after receiving the document information response 608. For instance, the intelligent document system 102 can receive from the requestor device a document modification prompt to "reduce the length of the three longest sentences in the digital document."

To reiterate, FIGS. 2-6 illustrate the intelligent document system 102 receiving one or more digital text prompts (e.g., document creation prompt, document modification prompt, and/or document information prompt). In one or more embodiments, in response to a document modification prompt, the intelligent document system 102 sends the document modification prompt along with previously sent digital text prompts to the large language model 604. In some embodiments, in response to a document modification prompt, the intelligent document system 102 sends the document modification prompt and the previously generated digital document to the large language model 604. Further, in some embodiments, the intelligent document system 102 persists a state of the large language model 604 (e.g., by using a memory registry data that saves data of the large language model 604 for the most recent iteration of digital text prompts, a call stack that stores the current scope of the large language model 604, and an instruction pointer to keep track of the next instruction to be executed) and regenerates the digital document based on the document modification prompt and the persisted state.

Although FIGS. 2-6 discuss the intelligent document system 102 providing the document creation interface 600, along with various additional interfaces, in one or more embodiments, the intelligent document system 102 provides a single end-to-end intelligent interface for performing all the tasks discussed above. To illustrate, the entire user experience can include the document creation interface 600, and the user sends digital text prompts to the intelligent document system 102 to instruct it to perform any of the actions discussed above.

Moreover, although FIGS. 2-6 show an interface for receiving document creation prompts and document modification prompts, in one or more embodiments, the intelligent document system 102 provides a first type of interface for creating digital documents (e.g., a document creation interface) and a second type of interface for modifying digital documents.

Figure 7:
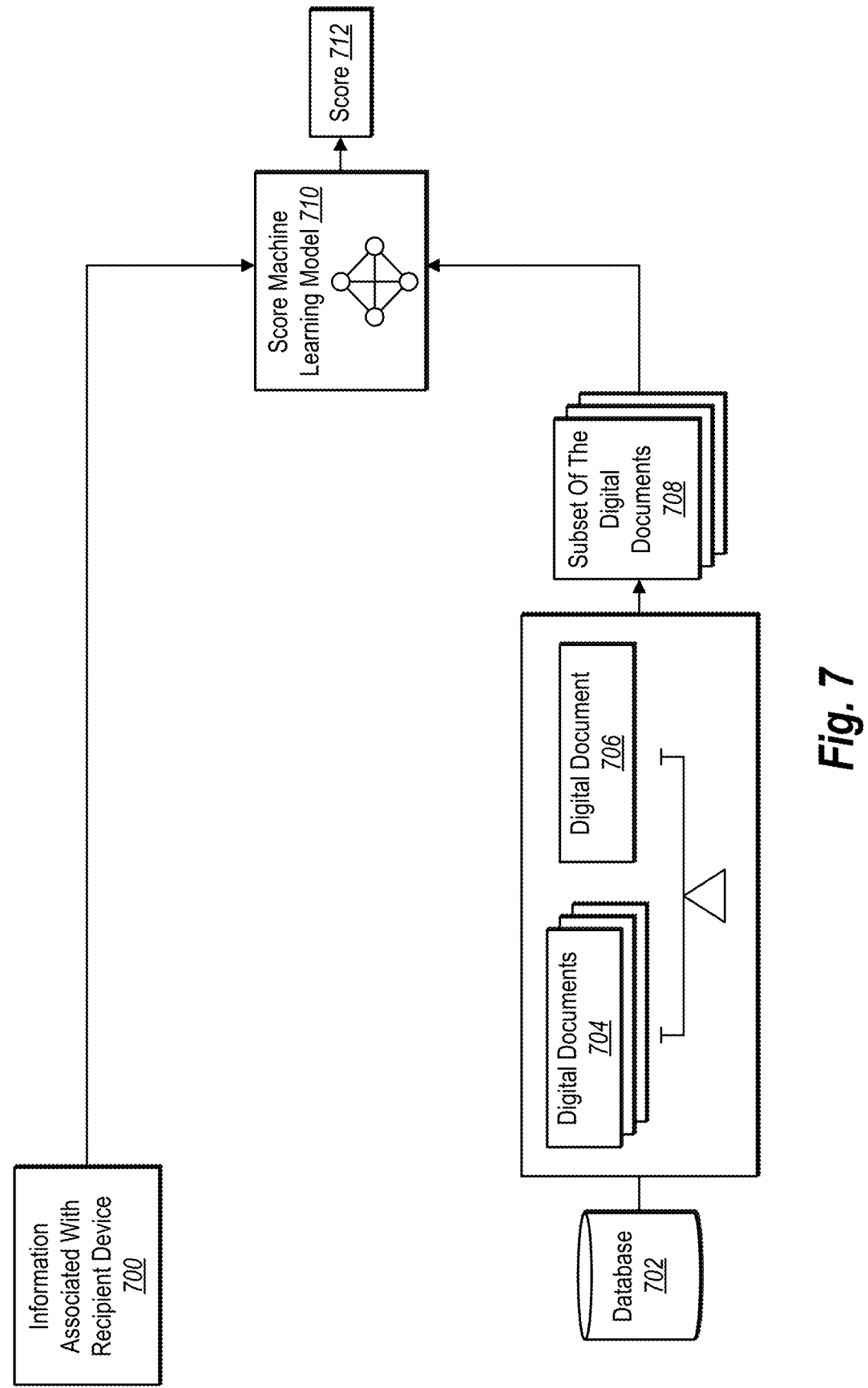
FIG. 7 illustrates an example diagram of the intelligent document system generating a score based on information associated with a recipient device in accordance with one or more embodiments.

As mentioned above, intelligent document system 102 further generates scores to assist a requestor device in generating a digital document. FIG. 7 illustrates an example of the intelligent document system 102 generating a score related to the digital document in accordance with one or more embodiments. For example, FIG. 7 shows the intelligent document system 102 receiving information 700 associated with a recipient device (e.g., a signor recipient device to sign the digital document). For instance, the intelligent document system 102 receives the information 700 based on the requestor device indicating a recipient device. Moreover, in some embodiments the information 700 includes identifying previously digital documents that the recipient device had signed. To illustrate, the intelligent document system 102 can identify a ratio or percentage for which the recipient device associated with the information 700 has signed digital documents. In other words, the intelligent document system 102 accesses past history of the recipient device.

Furthermore, as shown, the intelligent document system 102 utilizes a database 702 of the content management system 108 to further generate the score. For instance, the intelligent document system 102 accesses the database 702 (e.g., storing documents associated with the recipient device, and/or documents associated with additional user account(s)) to compare digital documents 704 within the database 702 with a digital document 706 (e.g., the digital document 706 includes the digital document to be sent out for signature as described above in FIGS. 2-6). In some such instances, based on a comparison between the digital documents 704 and the digital document 706, the intelligent document system 102 identifies a subset of the digital documents 708.

Specifically, the subset of the digital documents 708 includes digital documents that satisfy a similarity threshold with the digital document 706. For instance, the intelligent document system 102 can calculate a cosine similarity, a Euclidean distance, and/or generate word embeddings of the digital document 706 and compare the digital document 706 with the digital documents 704. In doing so, the intelligent document system 102 can establish a cut-off mark based on the various comparison methods (e.g., cosine similarity, Euclidian distance, or word embeddings) that indicates a satisfaction of similarity.

As shown in FIG. 7, the intelligent document system 102 inputs into a score machine learning model 710 the information 700 associated with the recipient device and the subset of the digital documents 708. In doing so, the score machine learning model 710 encodes the information 700 and the subset of the digital documents 708 to generate a prediction output or a score 712. Further, the intelligent document system 102 trains the score machine learning model 710 on past percentages/ratios of a signor recipient device signing the digital document and tagged digital documents that indicate similarity to a target digital document to generate predictions relating to a likelihood of the digital document 706 (e.g., target digital document) being signed. For instance, the score 712 can indicate that "there is a 90% likelihood that the recipient device completes a task related to the digital document."

Although not shown in FIG. 7, in one or more embodiments, the intelligent document system 102 weighs the inputs to the score machine learning model 710. For instance, the intelligent document system 102 weighs the information 700 associated with the recipient device to have an 0.80 weight to the score 712 and the subset of the digital documents 708 to have a 0.20 weight. In particular, the intelligent document system 102 weighs the information 700 higher than the subset of the digital documents 708 because it relates to the history of the recipient device of interest.

Figure 8:
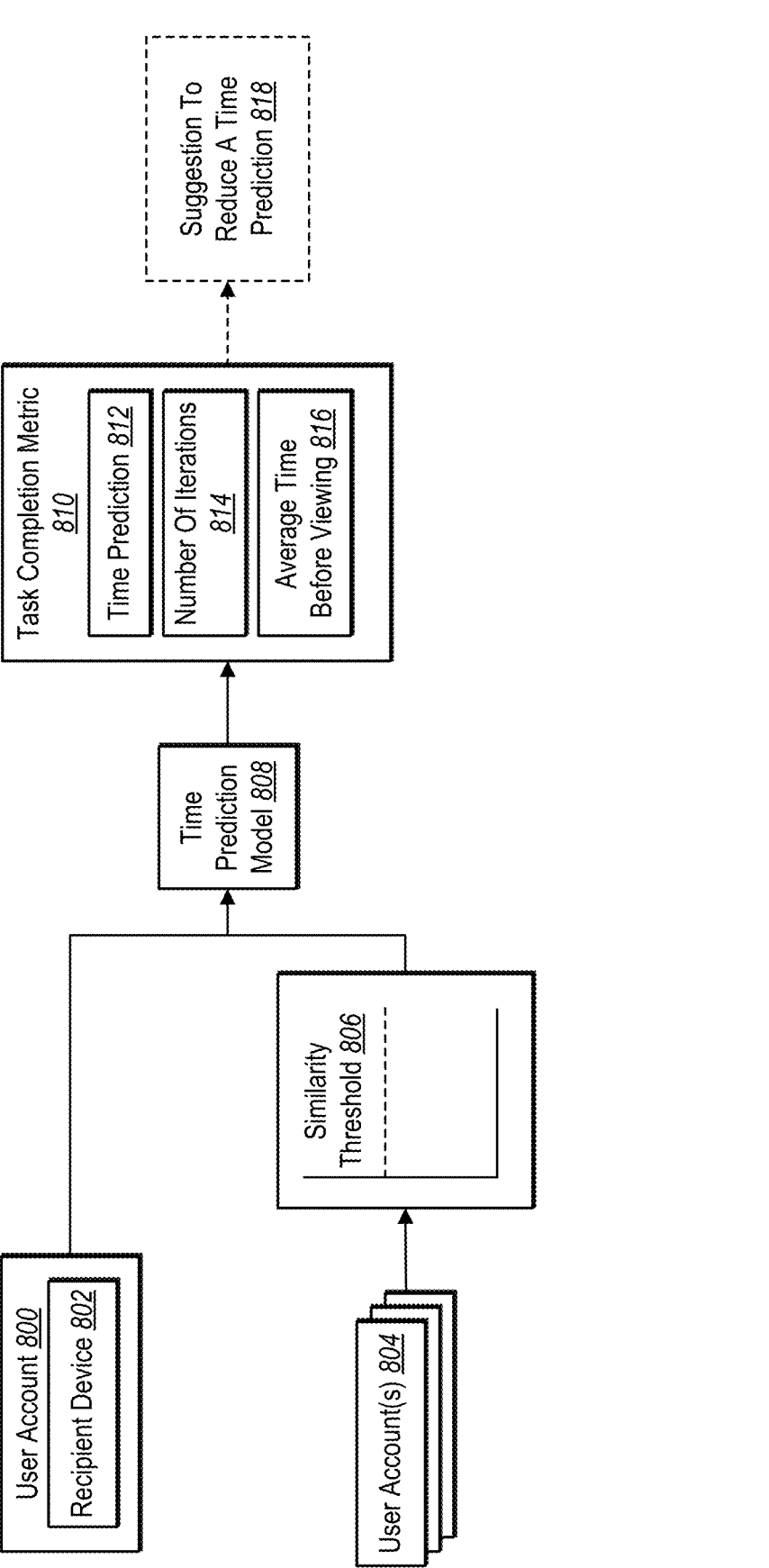
FIG. 8 illustrates an example diagram of the intelligent document system generating a task completion metric in accordance with one or more embodiments.

As mentioned above, in some embodiments the intelligent document system 102 generates a task completion metric to provide a suggestion to reduce the time to complete a task. FIG. 8 illustrates the intelligent document system 102 utilizing a time prediction model to generate a task completion metric in accordance with one or more embodiments.

For example, FIG. 8 shows the intelligent document system 102 receiving information from a recipient device 802 associated with a user account 800. For instance, the information from the user account 800 can include historical activity such as past sign rates, number of documents signed, activeness within the content management system 108 (e.g., if the user account 800 has an account associated with the content management system 108), and number of interactions with the intelligent document system 102. In some instances, the recipient device 802 associated with the user account 800 does not have an account associated with the content management system 108. However, in some such instances, if the recipient device 802 associated with the user account 800 has past interactions with the intelligent document system 102 (e.g., the requestor device via the intelligent document system 102), then the intelligent document system 102 can access that past interaction history to generate a metric.

In addition to the information associated with the recipient device 802, the intelligent document system 102 also accesses information from similar user accounts. As shown in FIG. 8, the intelligent document system 102 identifies user account(s) 804 (e.g., other user accounts part of the environment of the content management system 108 and the intelligent document system 102). Further, the intelligent document system 102 utilizes a similarity threshold 806 to identify a subset of user accounts deemed to satisfy the similarity threshold relative to the user account 800. In other words, the intelligent document system 102 identifies a subset of user accounts that have similar historical activity to the user account 800.

As described above, in some instances the intelligent document system 102 identifies similar accounts to the target recipient account (e.g., the user account 800). For example, identifying similar accounts can include the intelligent document system 102 determining similar account profile features (e.g., geographic location, age, gender, etc.) with a target recipient account. Moreover, in some instances, identifying similar accounts can include the intelligent document system 102 determining similar types of documents previously received by the similar accounts (e.g., similar in terms of the digital document being sent to the target recipient account). In other words, the similarity threshold can be based on features of the user accounts and/or features of the documents completed by the user accounts.

For example, FIG. 8 shows the intelligent document system 102 utilizing a time prediction model 808. For instance, the intelligent document system 102 utilizes the time prediction model 808 to take as input the information of the recipient device 802 associated with the user account 800 and the subset of the user account(s) 804. In some embodiments, the intelligent document system 102 implements the time prediction model 808 as a machine learning model or a neural network. In some such instances, the intelligent document system 102 trains the time prediction model 808 with tagged user account data indicating a similarity to a target user account to generate predictions related to task completion.

As shown in FIG. 8, the intelligent document system 102 utilizes the time prediction model 808 to generate a task completion metric 810. In one or more embodiments, "a task completion metric" refers to a metric that indicates a likelihood or a score for a recipient device completing a task (e.g., signing a digital document). For example, the task completion metric 810 can include an average time of completion. For instance, the intelligent document system 102 identifies at least one account that satisfies a similarity threshold with a target recipient account and determines the average time that similar account(s) took to complete a task. In some such instances, the average time of completion assists the intelligent document system 102 in determining potentially how long the target recipient account would take to complete the task at hand.

For instance, the task completion metric 810 can include a time prediction 812. For example, the time prediction 812 indicates a prediction of how long the recipient device 802 will take prior to completing the digital document. Specifically, the intelligent document system 102 generates the time prediction 812 based on the user account 800 and the similar user accounts. To illustrate, the time prediction 812 can be a prediction in terms of seconds, minutes, hours, days, weeks, or months.

Moreover, in some instances, the task completion metric 810 can include a number of iterations 814 (e.g., average number of iterations). For instance, the intelligent document system 102 identifies at least one account that satisfies a similarity threshold with a target recipient account and determines the average number of modifications performed by the at least one account(s). In some such instances, the average number of iterations assists the intelligent document system 102 in determining a potential complexity of the digital document task. To illustrate, the number of iterations 814 can indicate to the requestor device "on average, signor recipient devices took 5 days before signing."

Furthermore, in some instances the task completion metric 810 can include an average time before viewing 816 the digital document. For instance, the intelligent document system 102 identifies at least one account (e.g., a subset of user accounts) that satisfies a similarity threshold with a target recipient account (e.g., the recipient device 802) and determines for the subset of user accounts an average time prior to the subset of user accounts opening/viewing the digital document. In some such instances, the average time prior to viewing the digital document assists a requestor device of the intelligent document system 102 in determining how likely the target recipient account will turn the task around quickly. To illustrate, the average time before viewing 816 can indicate "on average, similar accounts took about 2 days before initially viewing the document."

Moreover, in some instances, the task completion metric 810 can include a number of digital documents previously completed (e.g., signed). For example, if a similar account to the target recipient account has previously completed ten documents, then the intelligent document system 102 generates a task completion metric that indicates a high likelihood of the target recipient account (e.g., the recipient device 802) completing the task.

Furthermore, as shown, in some embodiments the intelligent document system 102 generates a suggestion 818 to reduce a time prediction. For instance, if the intelligent document system 102 generates the time prediction 812 that indicates the task may take weeks to complete, the intelligent document system 102 can also generate the suggestion 818 to reduce the time prediction 812. To illustrate, the intelligent document system 102 can identify similar digital documents and similar user accounts (e.g., relative to the user account 800) and determine modifications made to the digital documents in those circumstances. For instance, the intelligent document system 102 can surface a suggestion to "add a clause in the employment contract regarding health care benefits, this may reduce the time to completion by 4 days."

As shown in FIGS. 1-6, the digital document generated by the intelligent document system 102 via the large language model comprises an employment contract tailored to a specific individual. In such circumstances, the intelligent document system 102 does not have data pertaining to additional recipient devices signing the same digital document (e.g., as described in FIGS. 7 and 8, the intelligent document system 102 can still identify similar user accounts and/or similar digital documents). However, in situations where the digital document generated by the intelligent document system 102 via the large language model is not tailored to a specific individual but meant to be sent to multiple signor recipient devices, the intelligent document system 102 can generate scores and/or suggestions based on additional user accounts that have also signed the digital document.

Figure 9A:
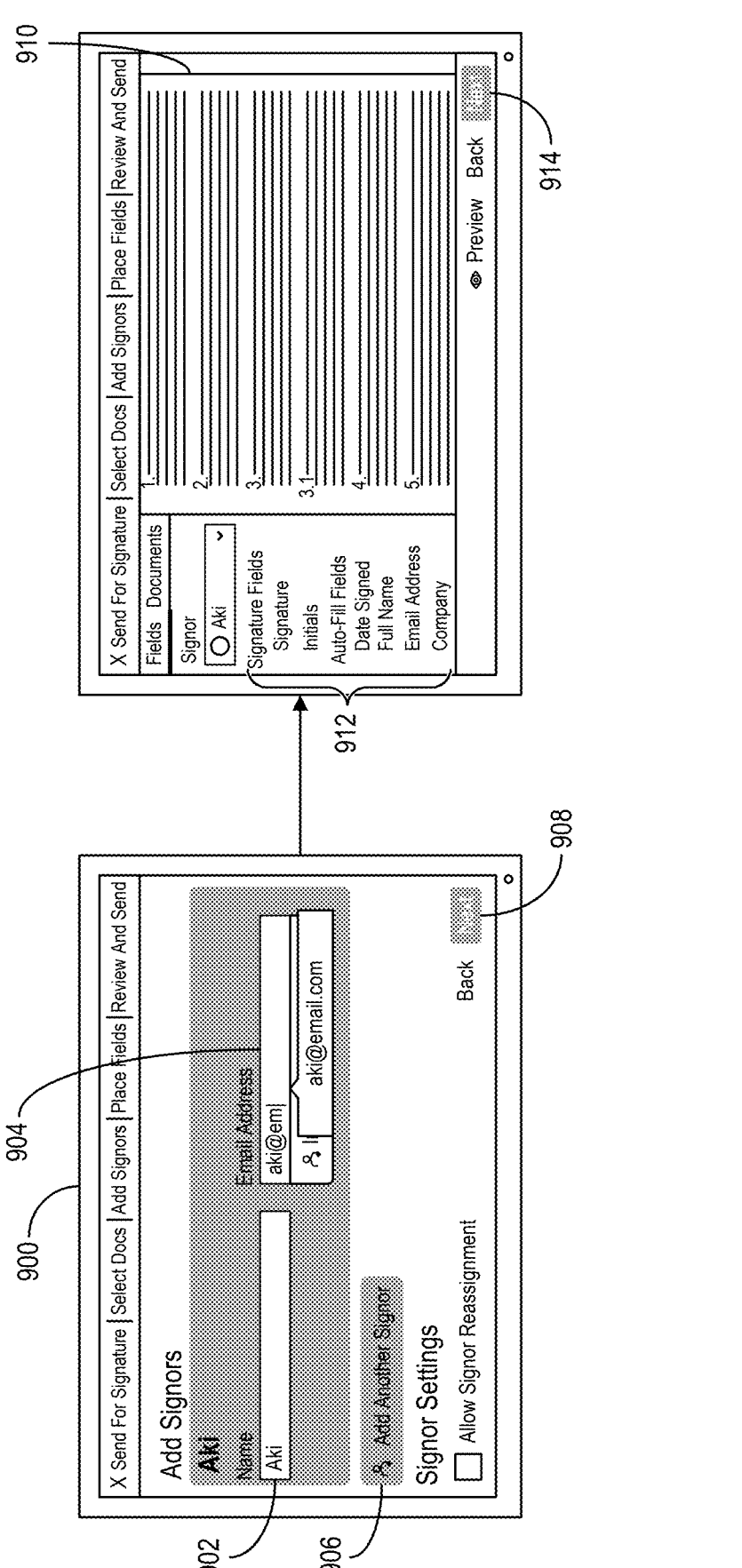
FIGS. 9A-9B illustrate an example diagram of the intelligent document system providing for a requestor device a user interface to send off the digital document to a recipient device in accordance with one or more embodiments.

FIG. 9A illustrates a requestor device preparing to send off a digital document to one or more recipient devices. For example, FIG. 9A shows an interface 900 to indicate one or more recipient devices. For instance, the intelligent document system 102 causes the graphical user interface to transition from the document creation interface (described above) to the interface 900 based on a selection of an element within the document creation interface. Although not shown above, in one or more embodiments, the intelligent document system 102 provides an element within the document creation interface that indicates that the requestor wishes to proceed to sending the generated digital document to one or more recipient devices. In some such instances, in response to selecting the element, the intelligent document system 102 transitions to the interface 900.

As shown in FIG. 9A, the interface 900 further includes a name field 902 for entering the name of a recipient device and an email field 904 for entering the email of the recipient device. Furthermore, the interface 900 also includes a selectable element 906 to add an additional recipient device and a selectable element 908 to proceed to the next step. For instance, as shown in FIG. 9A, in response to selecting the selectable element 908 (e.g., "next"), the intelligent document system 102 causes the graphical user interface to transition from the interface 900 to a requestor review interface 910. For example, the requestor review interface 910 shows the digital document to be sent to a recipient device and tools 912 to apply to the digital document. For instance, the tools 912 include adding a signature field, an initials field, a title field (e.g., add company name), an email address field, or any other field relevant to the recipient device to fill in.

Figure 9B:
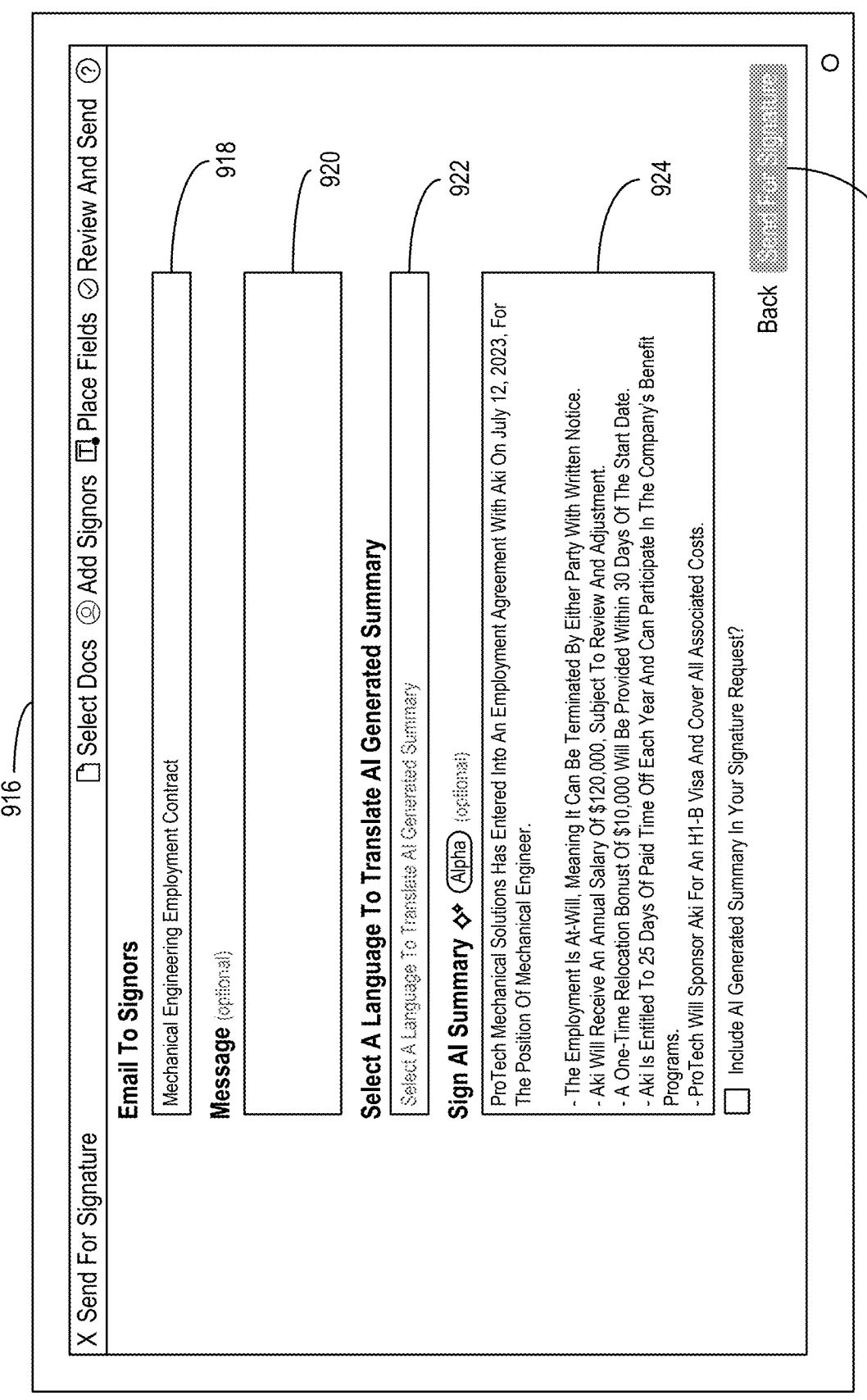

FIG. 9B illustrates the intelligent document system 102 generating a summary of the digital document to send to a recipient device in accordance with one or more embodiments. For example, in response to a selection of a selectable element 914, the intelligent document system 102 transitions the graphical user interface from the requestor review interface 910 to a document summary interface 916. Specifically, the document summary interface 916 includes an email subject field 918, an option message field 920, and a target language field 922 (e.g., each of these fields are modifiable).

In one or more embodiments, the intelligent document system 102 identifies a target language of a recipient device. Further, in some such embodiments the intelligent document system 102 utilizes the large language model to generate the digital document and/or the summary of the digital document in the target language. For instance, a target language includes a native language or a preferred language of a recipient device. Moreover, in some embodiments, the intelligent document system 102 provides in the document summary interface 916 an option for the requestor device to indicate the target language of the recipient device. In some instances where there are multiple recipient devices, the intelligent document system 102 provides in the document summary interface 916 an option to indicate the target language for each recipient device.

In one or more embodiments, the intelligent document system 102 identifies geographic or language features of one or more recipient devices. For instance, for recipient devices with user accounts associated with the content management system 108, the intelligent document system 102 accesses account profile features to determine target languages for the recipient devices. Based on determining the target languages, the intelligent document system 102 can automatically populate the target language field 922.

As shown, the intelligent document system 102 also provides in the document summary interface 916, a summary 924 of the digital document. In one or more embodiments, the intelligent document system 102 utilizes the large language model to generate a summary of the digital document. For instance, the intelligent document system 102 utilizes the large language model to rank order parts of the digital document and further displays the ranked order parts in a bullet point list. In some instances, the intelligent document system 102 determines to display only a predetermined number of bullet points. Further, in some instances, the intelligent document system 102 summarizes the entire digital document and provides for display the summary in the same order as the digital document.

Furthermore, in some embodiments the intelligent document system 102 provides the summary of the digital document in an editable text interface. For instance, the intelligent document system 102 allows the requestor device to edit the summary of the digital document. In some instances, editing the summary of the digital document modifies the summary sent to the recipient device(s). In some instances, editing the summary of the digital document modifies the underlying digital document. In some such instances, the intelligent document system 102 detects a modification to the summary 924, sends the summary 924, the digital document, and document parameters to the large language model, and returns an updated digital document.

Furthermore, as shown in FIG. 9B, the intelligent document system 102 further provides a selectable element 926 that reads "send for signature." Specifically, the intelligent document system 102 receiving a selection of the selectable element 926 causes the intelligent document system 102 to send the digital document, the summary, and any corresponding requirements (subject line, optional message, etc.) to the recipient device(s).

As mentioned above, the intelligent document system 102 interacts with the digital signature system 106 to complete a task related to a digital document. For example, the intelligent document system 102 sends the digital document from the requestor device to obtain a signature from a recipient device by passing the digital document to the digital signature system 106. In particular, the recipient device performs actions and the intelligent document system 102 receives the actions. In some embodiments, upon completion of the digital document by the recipient device, the intelligent document system 102 indicates the completion to the digital signature system 106.

Figure 10:
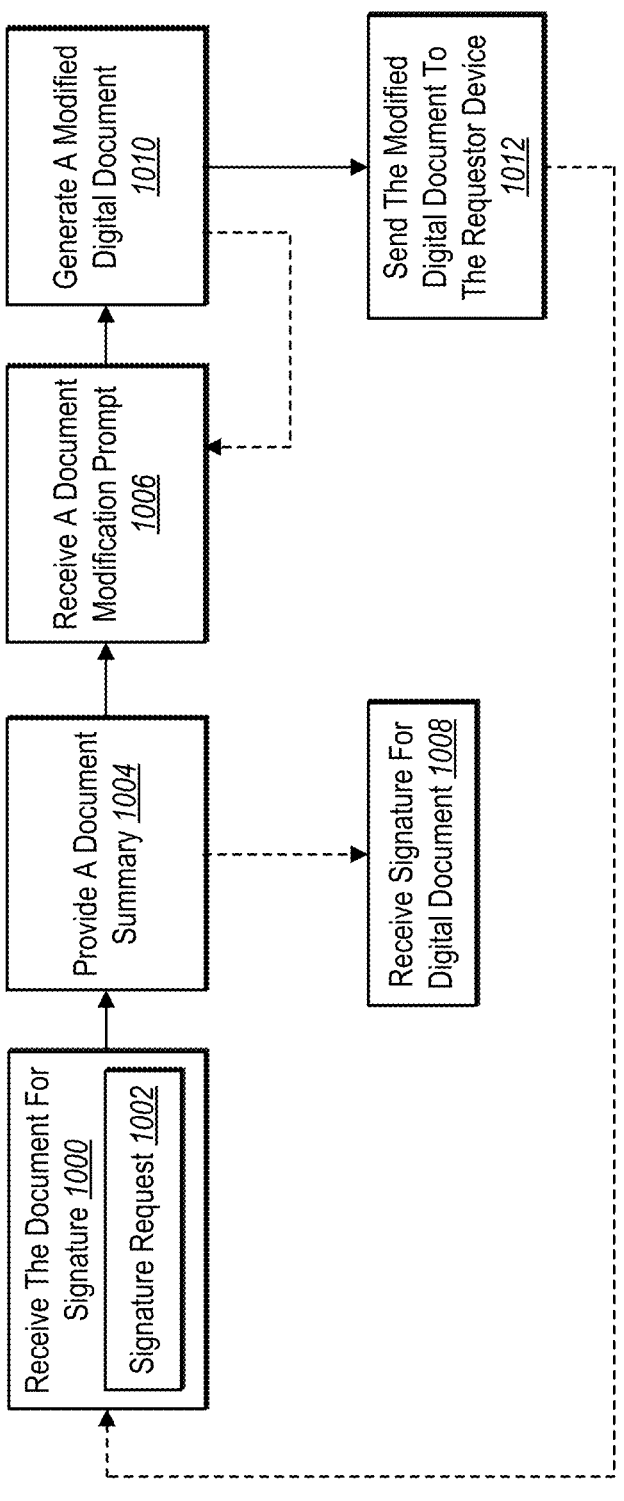
FIG. 10 illustrate an overview diagram of the intelligent document system sending the digital document to a signor recipient device and receiving a modification and/or a digital signature in accordance with one or more embodiments.

For example, FIG. 10 shows the intelligent document system 102 performing an act 1000 of receiving the digital document for signature at a recipient device (e.g., a signor recipient device). For instance, as part of receiving the digital document for signature, the intelligent document system 102 provides a signature request notification 1002 to the recipient device. To illustrate, the signature request notification 1002 can indicate to the recipient device of a pending digital document awaiting signature.

Moreover, in response to the recipient device selecting the signature request notification 1002, the intelligent document system 102 can perform an act 1004 of providing a document summary. In particular, the intelligent document system 102 provides the document summary as shown in FIG. 9B. Moreover, the intelligent document system 102 can provide the document summary in an email application of the recipient device, an SMS application of the recipient device, or another messaging application associated with the recipient device.

Moreover, in some embodiments, the intelligent document system 102 provides a selectable element within an interface that shows the document summary, a document review interface. Further, in some embodiments, selecting the selectable element causes the intelligent document system 102 to provide for display a document review interface.

In one or more embodiments, "a document review interface" refers to a software application interface to facilitate the review and modification of digital documents. For instance, the intelligent document system 102 provides the document review interface for a requestor device to review digital documents received from the requestor device. To illustrate, the intelligent document system 102 provides in the document review interface a text field for entering text prompts to modify digital documents and/or propose modifications to digital documents. Accordingly, in some embodiments the intelligent document system 102 provides the document review interface to the signor recipient device to generate modifications to a digital document or to generate proposed modifications to send the proposals and/or the modified version of the digital document back to the requestor device.

As shown in FIG. 10, in some embodiments after providing the document summary to the recipient device, the intelligent document system performs an act 1008 of receiving a signature for the digital document from the recipient device. For instance, in such cases the recipient device does not indicate any desire to modify the digital document and proceeds to completing the digital document (e.g., providing a digital signature for the digital document). In some such instances, the intelligent document system 102 can transmit the indication of a completed digital document to the digital signature system 106. Further, in some such instances, the intelligent document system 102 can further transmit the completed digital document to the requestor device.

In one or more embodiments, the intelligent document system 102 provides a single selectable element to sign or complete all placeholder fields within the digital document provided to the recipient device. For instance, in situations where the placeholder fields within the digital document relate to digital signatures or digital initials, the single selectable element provides the convenience and efficiency of filling in all the fields in response to a single user interaction.

As mentioned, in the document review interface the intelligent document system 102 can provide a text field for entering document modification prompts. As shown in FIG. 10, the intelligent document system 102 performs an act 1006 of receiving a document modification prompt from the recipient device. Moreover, as shown, in some such instances the intelligent document system 102 can further perform an act 1010 of generating a modified digital document. Similar to the above discussion regarding a document modification prompt, in one or more embodiments the intelligent document system 102 generates the modified digital document in response to a document modification prompt from the signor recipient device. For instance, the modified digital document includes a version of the digital document with an added and/or removed portion based on an indication from the recipient device. In some embodiments, after generating the modified digital document, the intelligent document system 102 can further receive additional document modification prompts to further iterate on the modified digital document.

As shown, the intelligent document system 102 performs an act 1012 of sending the modified digital document to the requestor device. Moreover, in some instances the requestor device further sends back the modified digital document for the recipient device and the recipient device is notified of the pending signature request. In some instances, when the recipient device is satisfied with a single iteration of the modified digital document, the recipient device can determine to sign the digital document and the requestor device would receive the signed digital document from the intelligent document system 102.

Figure 11:
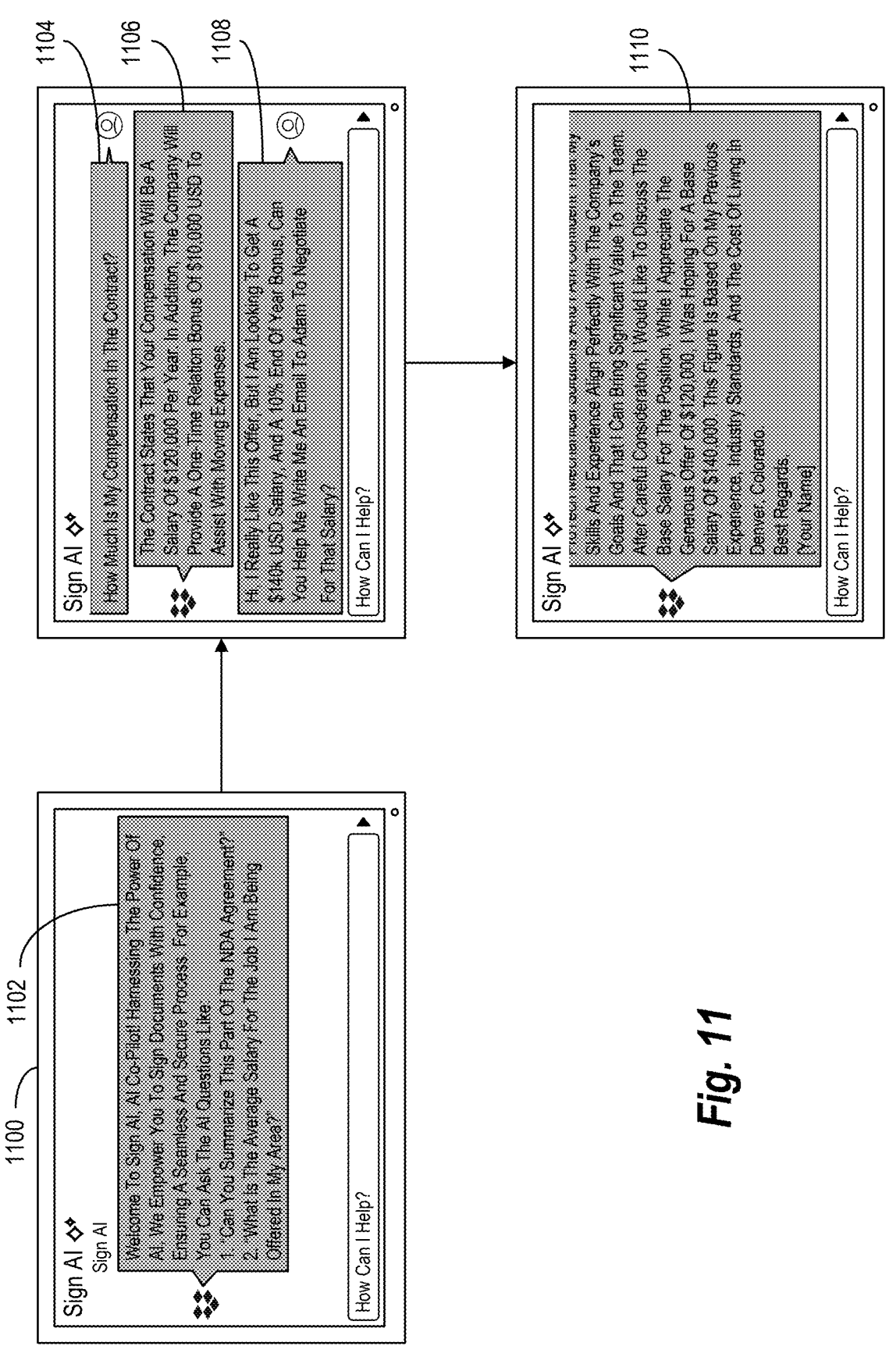
FIG. 11 illustrate an example diagram of the intelligent document system receiving from a recipient device, document modification prompts and generating a draft message to send to the requestor device in accordance with one or more embodiments.

As mentioned above, the intelligent document system 102 can receive digital text prompts from the recipient device. FIG. 11 illustrates the intelligent document system 102 receiving a document information prompt from the recipient device in accordance with one or more embodiments. For example, FIG. 11 shows a document review interface 1100 and a message 1102 from the intelligent document system 102. Specifically, the message 1102 reads "Welcome to the sign AI, AI co-pilot! Harnessing the power of AI, we empower you to sign documents with confidence, ensuring a seamless and secure process. For example, you can ask the AI questions like: 1. Can you summarize this part of the NDA agreement? 2. What is the average salary for the job I am being offered in my area?"

As shown in FIG. 11, the intelligent document system 102 further receives a document information prompt 1104 from the recipient device that reads "how much is my compensation in the contract?" In response, the intelligent document system 102 generates a message 1106 that reads "the contract states that your compensation will be a salary of $120,000 per year. In addition, the company will provide a one-time relocation bonus of $10,000 USD to assist with moving expenses." Specifically, the intelligent document system 102 generates the message 1106 by sending the document information prompt 1104 to a large language model along with the digital document to generate the generative LLM response. Further, the intelligent document system 102 converts the generative LLM response into the message 1106 for display in the document review interface 1100.

Moreover, FIG. 11 shows the intelligent document system 102 receiving an additional digital text prompt 1108 that reads "Hi, I really like this offer, but I am looking to get a $140 k USD salary, and a 10% end of year bonus, can you help me write an email to the hiring manager to negotiate for that salary?" As shown in FIG. 11, in response to the additional digital text prompt 1108, the intelligent document system 102 generates an additional message 1110 and provides the additional message 1110 to the recipient device via the document review interface 1100. Specifically, the intelligent document system 102 generates the additional message 1110 with the principles discussed above and as discussed in FIGS. 2-9B.

To illustrate, the additional message 1110 can read "Dear Hiring Manager, I hope this message finds you well. I am writing to discuss the terms of the employment agreement that was recently presented to me. I am genuinely excited about the opportunity to join your firm and contribute to the team as a mechanical engineer. I believe that my skills and experience align perfectly with the company's goals, and I am confident that I can bring significant value to the team. After careful consideration, I would like to discuss the base salary for the position. While I appreciate the generous of $120,000, I was hoping for a base salary of $140,000. This figure is based on my previous experience, industry standards, and the cost of living in Salt Lake City, Utah. In addition, I would like to propose a 10% end-of-year bonus structure. I believe this addition will further motivate me to exceed the company's expectations and align my goals with the success of the firm. I am confident that we can reach a mutually beneficial agreement and I am open to discussion on this matter. Thank you for considering my proposal. I look forward to your response."

In one or more embodiments, when the intelligent document system 102 generates the additional message 1110, the intelligent document system 102 can also provide an option to send the additional message 1110 directly from the document review interface 1100. For instance, in response to a selectable element to send the additional message 1110, the intelligent document system 102 sends a message containing the additional message 1110 to the requestor device.

Figure 12:
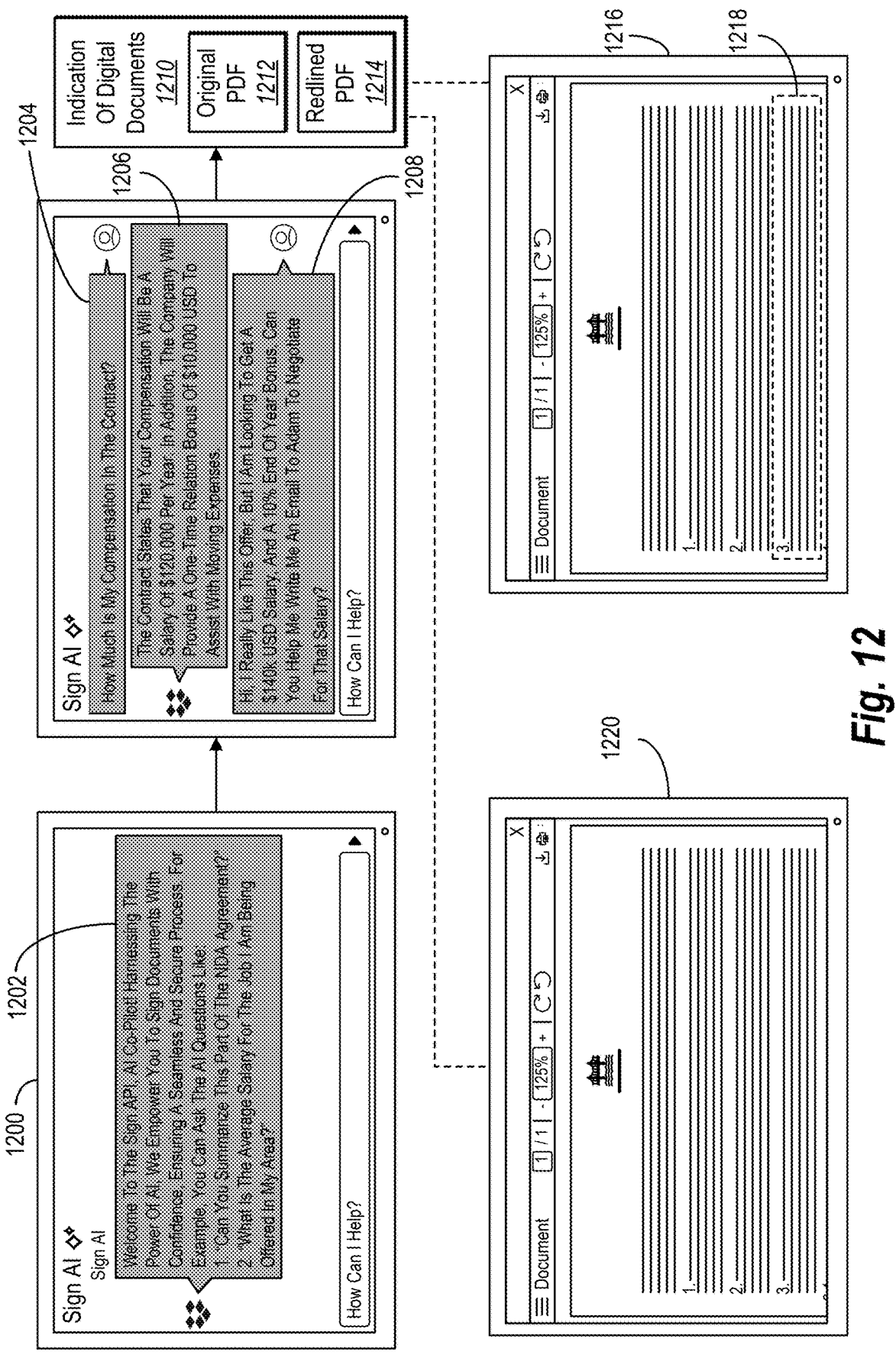
FIG. 12 illustrate an example diagram of the intelligent document system receiving redlined changes to the digital document and providing an indication of the digital document and the modified digital document in accordance with one or more embodiments.

FIG. 12 shows the intelligent document system 102 generating a redlined digital document in response to a digital text prompt received from the recipient device. For example, FIG. 12 shows a document review interface 1200 with a message 1202 from the intelligent document system 102 (discussed above in FIG. 11). Furthermore, FIG. 12 shows a document information prompt 1204, a message 1206, and then an additional prompt 1208 (also discussed above in FIG. 11).

Moreover, as shown in FIG. 12, in response to the additional prompt 1208, the intelligent document system 102 generates an indication 1210 of the digital documents. Specifically, the indication 1210 of the digital documents includes an original PDF 1212 and a redlined PDF 1214. For example, a redlined portion includes strikethroughs and underlines to indicate deleted portions of a digital document and added portions of a digital document, respectively.

Furthermore, as shown, based on selecting the indication 1210 of the digital documents, the intelligent document system 102 can cause the graphical user interface to show both the original PDF 1212 and the redlined PDF 1214. For instance, a file view 1220 shows the original PDF 1212 while a file view 1216 shows the redlined PDF 1214. Specifically, the file view 1216 also shows an indication 1218 that indicates that difference in clause three between the original PDF 1212 and the redlined PDF 1214.

Figure 13A:
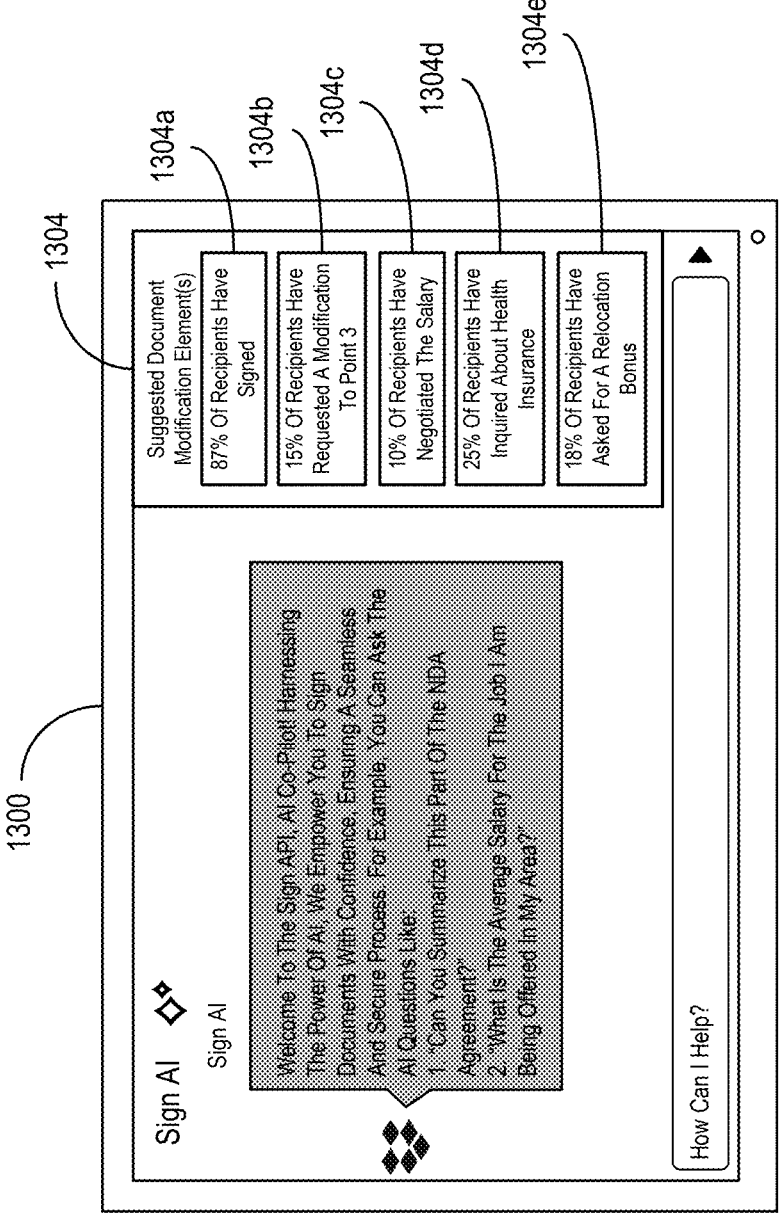
FIGS. 13A-13C illustrate example diagrams of the intelligent document system providing for display suggested document modification elements and generating various scores in accordance with one or more embodiments.

FIG. 13A shows the intelligent document system 102 providing suggested document modification elements in accordance with one or more embodiments. In one or more embodiments, "document modification elements" refers to tools for modifying the digital document. For instance, the document modification elements include redlining tools (e.g., for directly changing the digital document), scores that indicate potential modifications, signature tools, and a text prompt to modify the digital document.

As shown in FIG. 13A, the intelligent document system 102 also provides in a document review interface 1300 suggested document modification element(s) 1304. In one or more embodiments, "suggested document modification elements" refers to the intelligent document system 102 identifying similar content items and features of the signor recipient device to determine suggestions for modifying the digital document.

For instance, the suggested document modification element(s) 1304 can include suggestions 1304a-1304e. To illustrate, the suggested document modification element(s) 1304 shows that 87% of recipients have signed the digital document, 15% of recipients have requested a modification to point 3, 10% of recipients have negotiated the salary, 25% of recipients have inquired about health insurance, and 18% of recipients have asked for a relocation bonus. Moreover, in response to the intelligent document system 102 receiving a selection of at least one of the suggestions 1304a-1304e, the intelligent document system 102 generates a digital text prompt in line with the selected suggestion (e.g., by utilizing previously submitted digital text prompts corresponding with the selected suggestion(s) or by utilizing the large language model to generate a digital text prompt based on the selected selection and the context of the current digital document).

As just mentioned, the intelligent document system 102 shows the suggestions 1304a-1304e. Further, in some embodiments, the suggestions 1304a-1304e include the intelligent document system 102 identifying additional signor recipient devices that signed the digital document and for the additional signor recipient devices that signed, the intelligent document system 102 further identifies submitted digital text prompts. In one or more embodiments, based on the intelligent document system 102 identifying additional signor recipient devices that signed the digital document, the intelligent document system provides prompt suggestions (e.g., the suggestions 1304a-1304e) in the document review interface 1300.

Figures 13B, 13C:
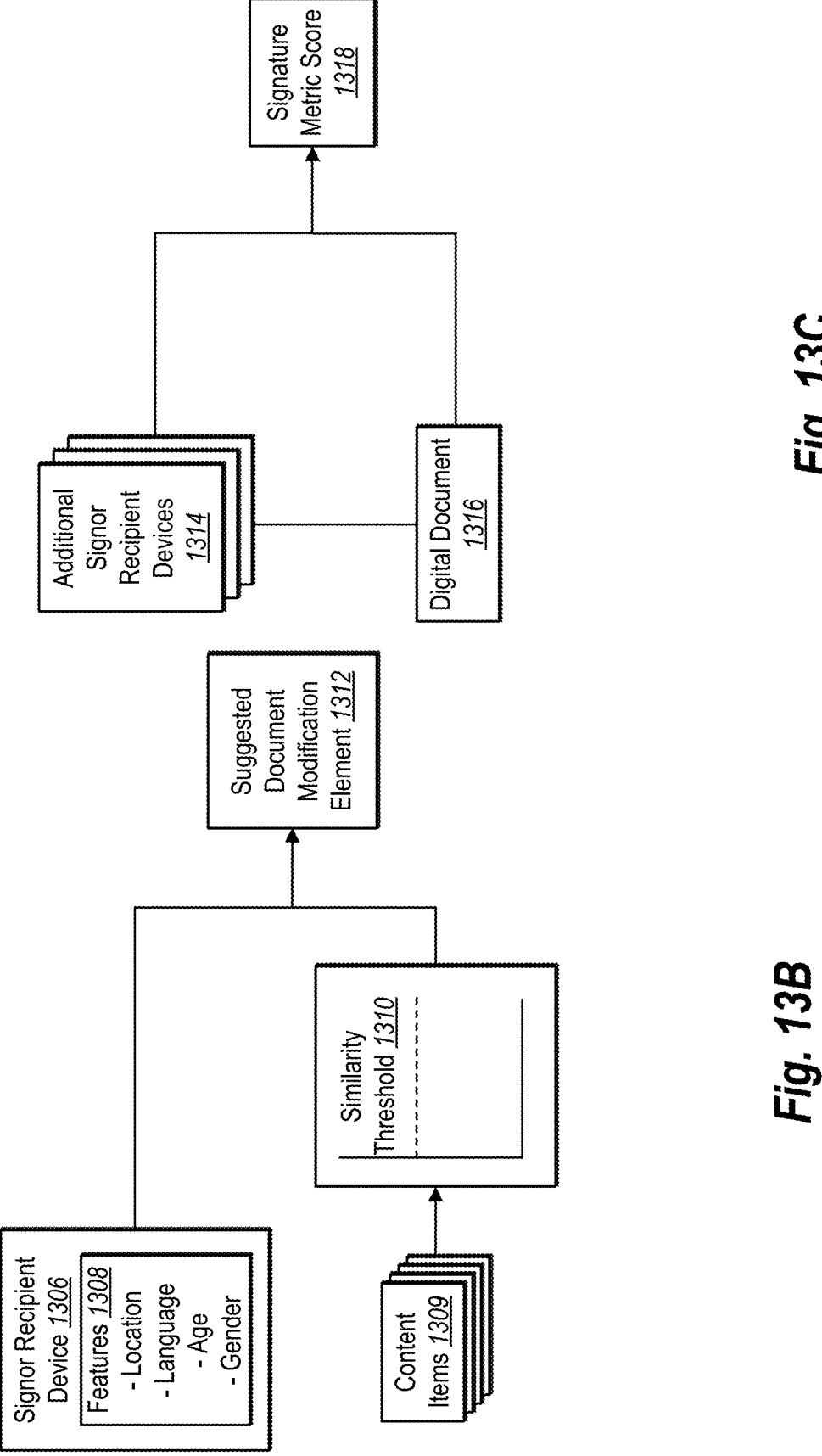

FIG. 13B illustrates the intelligent document system 102 generating a suggested document modification element in accordance with one or more embodiments. For example, FIG. 13B shows the intelligent document system 102 determining features 1308 for a signor recipient device 1306. For instance, the features 1308 associated with the signor recipient device 1306 include geographic location (e.g., IP address), regulations and laws pertaining to the geographic location, an age of a user of the signor recipient device 1306, a gender of the user of the signor recipient device 1306, previous job history of a user of the signor recipient device 1306, and user account history (e.g., frequency in signing digital documents, content items contained within the content management system 108).

Furthermore, from content items 1309, the intelligent document system 102 utilizes a similarity threshold to identify a subset of the content items 1309 that satisfy the similarity threshold 1310. For instance, similar to the discussion above, the intelligent document system 102 can employ cosine similarity, Euclidean distance, or a vector embedding space to determine the similarity of the content items 1309 with the digital document at hand. As further shown in FIG. 13B, based on both the features 1308 and the subset of the content items 1309, the intelligent document system 102 generates a suggested document modification element 1312.

To illustrate, in some instances the intelligent document system 102 determines that a user of the signor recipient device 1306 resides in Canada. Further, in some such instances the intelligent document system 102 can determine content items similar to the digital document at hand that indicates a health care clause as part of the employment contract. Based on the geographic location being Canada (e.g., the healthcare benefits provided in Canada are generally considered more publicly accessible whereas the healthcare benefits in the United States are typically provided through an employer) and the health care clauses identified from additional documents, the intelligent document system 102 can determine that the signor recipient device 1306 may be interested in modifying the digital document to include a health care clause.

FIG. 13C shows the intelligent document system 102 generating a signature metric score based on additional signor recipient devices and the digital document in accordance with one or more embodiments. For example, FIG. 13C shows the intelligent document system 102 identifying additional signor recipient devices 1314 that have previously signed a digital document 1316 (e.g., the target digital document that the signor recipient device will potentially sign).

Further, as shown, based on the additional signor recipient device 1314, the intelligent document system 102 generates a signature metric score 1318. In one or more embodiments, "a signature metric score" refers to an indication for the signor recipient device regarding the legitimacy or safety of signing the digital document. For example, the signature metric score 1318 can include a percentage of additional signor recipient devices that signed the digital document, an average amount of time taken by the additional signor recipient devices to sign the digital document, and a signor document modification rate.

For instance, the percentage of additional signor recipient devices indicates to the signor recipient device how often other signor recipient devices signed the digital document. For a high percentage, this indication can give the signor recipient device some measure of confidence regarding the legitimacy of the digital document.

Furthermore, in some instances, the average amount of time taken by the additional signor recipient devices to sign can indicate to the signor recipient device an potential amount of time for the complexity of the digital document (e.g., a higher average time indicates it took longer for additional signor recipient devices to review the digital document).

Moreover, in some instances, the signor document modification rate can indicate to the signor recipient device potential issues within the digital document. For example, for a high modification rate, this can signal to the signor recipient device that there may be lots of changes that need to be made to the digital document.

Figure 14:
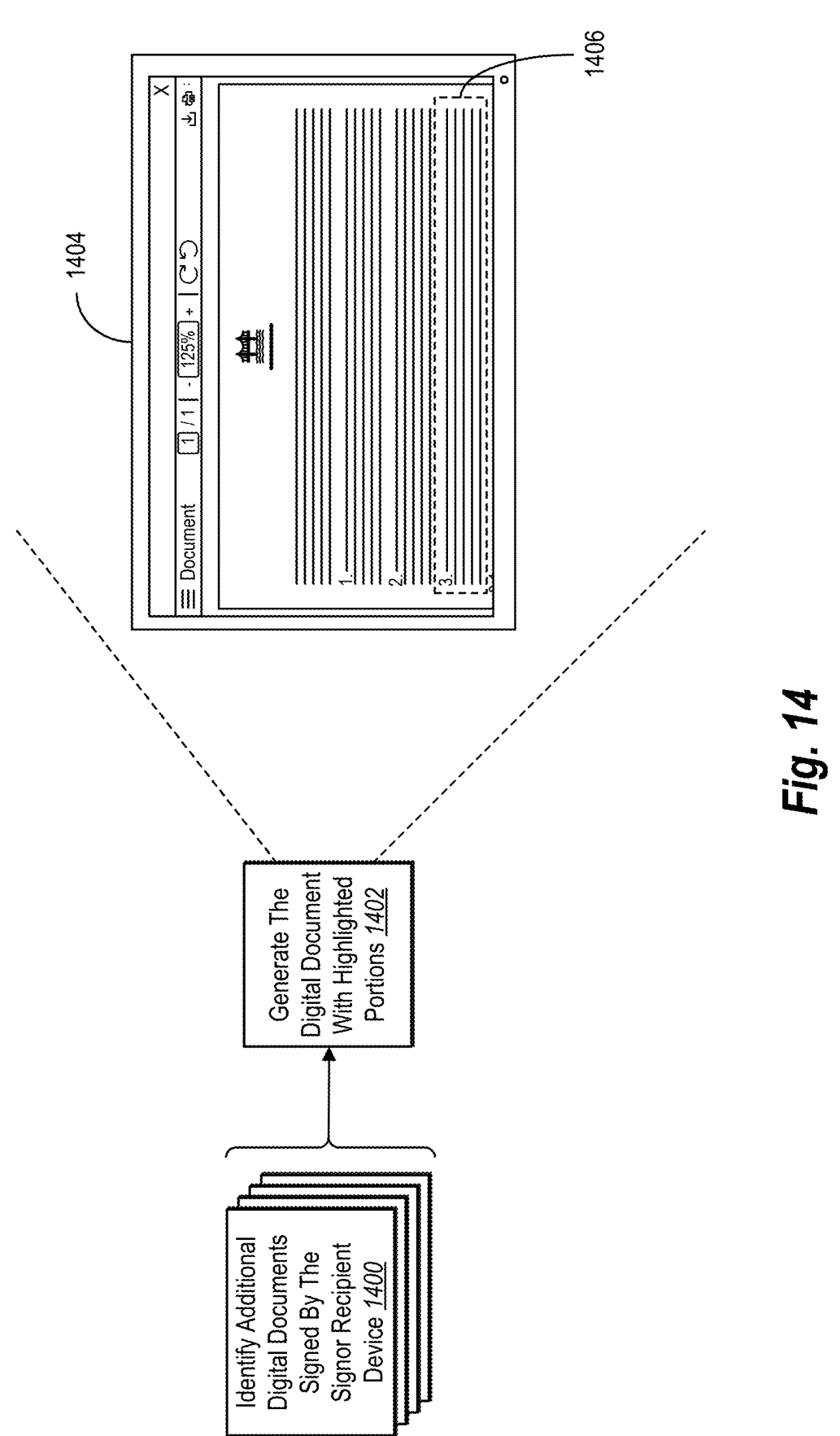
FIG. 14 illustrate an example diagram of the intelligent document system identifying similar digital documents completed by the signor recipient device and highlighting the difference between the two digital documents in accordance with one or more embodiments.

FIG. 14 shows the intelligent document system 102 identifying similar digital documents previously completed by the signor recipient device and highlighting the difference between a current digital document and the previous digital document in accordance with one or more embodiments. For example, the intelligent document system 102 performs an act 1400 of identifying additional digital documents signed by the signor recipient device. In particular, the intelligent document system 102 accesses the history of the signor recipient device to identify signed digital documents.

Moreover, in some embodiments the intelligent document system 102 performs a similarity comparison between the current digital document and the previously signed digital documents. In some such embodiments, for previously signed digital documents that satisfy a similarity threshold (e.g., 90% similarity) the intelligent document system 102 performs an act 1402 of generating the digital document with highlighted portions. For instance, as shown in FIG. 14, the intelligent document system 102 generates a file view 1404 of the digital document and further provides an indication 1406 (e.g., a highlighted portion) of the portion of the digital document that differs from a previously signed digital document.

In addition, in one or more embodiments, the intelligent document system 102 generates the file view 1404 of the digital document and provides an additional indication of the portion of the digital document that is similar to a previously signed digital document. For instance, the intelligent document system 102 provides an option for a user to indicate whether the user would like to see the differences or the similarities. In some embodiments, the intelligent document system 102 can highlight/emphasize both the differences and the similarities with different indicators (colors, shapes, etc.).

While FIG. 15 illustrates acts according to certain implementations, alternative implementations may omit, add to, reorder, and/or modify any of the acts shown in FIG. 15. The acts of FIG. 15 can be performed as part of a method. Alternatively, a non-transitory computer-readable medium can comprise instructions, that when executed by one or more processors, cause a computing device to perform the acts of FIG. 15. In still further implementations, a system can perform the acts of FIG. 15.

As illustrated in FIG. 15, a series of acts 1500 may include an act 1502 of providing a document creation interface that includes an input field for entering text prompts to generate and modify digital documents, an act 1504 of receiving a document generation prompt defining document parameters, an act 1506 of in response to the document generation prompt, generating a digital document using a large language model to process the document parameters, and an act 1508 of providing an indication for display on the requestor device within the document creation interface, the indication comprises the generated digital document.

In particular the act 1502 includes providing, for display on a requestor device associated with a user account, a document creation interface comprising an input field for entering text prompts to generate and modify digital documents. Further, the act 1504 includes receiving, from the requestor device via the document creation interface, a document generation prompt defining document parameters. Moreover, the act 1506 includes in response to the document generation prompt, generating a digital document using a large language model to process the document parameters based on content items stored for the user account within a content management system. Additionally, the act 1508 includes providing an indication for display on the requestor device within the document creation interface, the indication comprises the generated digital document.

Further, in one or more embodiments the series of acts 1500 includes receiving, from the requestor device, a document modification prompt for the digital document, the document modification prompt defining at least one additional document parameter. Additionally, in one or more embodiments the series of acts 1500 includes in response to the document modification prompt, generating a modified digital document using the large language model. Moreover, in one or more embodiments the series of acts 1500 includes providing an additional indication of the modified digital document for display on the requestor device within the document creation interface.

Furthermore, in one or more embodiments the series of acts 1500 includes receiving, via the text field in the document creation interface, a document information prompt related to one or more digital document properties. Additionally, in one or more embodiments the series of acts 1500 includes based on the document information prompt, receiving a document information response from the large language model, the document information response comprising at least one digital document property. Moreover, in one or more embodiments the series of acts 1500 includes generating, for the digital document, a score that indicates a likelihood of a recipient device completing a task related to the digital document. Further, in one or more embodiments the series of acts 1500 includes identifying whether a recipient device previously provided a digital signature related to a different digital document or identifying digital signature rates for additional digital documents that satisfy a similarity threshold with the digital document.

Further, in one or more embodiments the series of acts 1500 includes identifying at least one account that satisfies a similarity threshold with a recipient account associated with the recipient device. Moreover, in one or more embodiments the series of acts 1500 includes determining a task completion metric associated with the at least one account. Additionally, in one or more embodiments the series of acts 1500 includes generating the time prediction based on the task completion metric.

Moreover, in one or more embodiments the series of acts 1500 includes generating a time prediction for a recipient device to provide a digital signature for the digital document. Further, in one or more embodiments the series of acts 1500 includes generating a suggestion to modify the digital document to reduce the time prediction for the recipient device to provide the digital signature for the digital document. Additionally, in one or more embodiments the series of acts 1500 includes receiving an indication of a first content item and a second content item from the content management system to provide to the large language model as part of the document generation prompt.

Moreover, in one or more embodiments the series of acts 1500 includes generating a summary of the digital document to send to a recipient device along with a signature request of the digital document Further, in one or more embodiments the series of acts 1500 includes providing, for display on the requestor device, and editable version of the summary of the digital document. Further, in one or more embodiments, the series of acts 1500 includes providing the digital document as a PDF file and receiving a request from the requestor device to send the digital document as the PDF file to a recipient device to obtain a digital signature from the recipient device.

Furthermore, in one or more embodiments the series of acts 1500 includes providing, for display on a requestor device associated with a user account, a document creation interface comprising an input field for entering text prompts to generate and modify digital documents. Moreover, in one or more embodiments, the series of acts 1500 includes receive, from the requestor device via the document creation interface, a document generation prompt defining document parameters. Moreover, in one or more embodiments, the series of acts 1500 includes in response to the document generation prompt, generate a digital document using a large language model to process the document parameters based on content items stored for the user account within a content management system. Further, in one or more embodiments, the series of acts 1500 includes in response to a modification prompt defining modified document parameters for the digital document, generate a modified digital document using the large language model.

Moreover, in one or more embodiments the series of acts 1500 includes providing indication for display on the requestor device within the document creation interface, the indication comprises the generated digital document. Further, in one or more embodiments the series of acts 1500 includes receiving, from the requestor device, the modification prompt for the digital document, the modification prompt comprising an indication to modify a portion of the digital document. Further, in one or more embodiments, the series of acts 1500 includes receiving an additional modification prompt for the modified digital document. Moreover, in one or more embodiments, the series of acts 1500 includes generate an additional modified digital document based on the additional modification prompt.

Moreover, in one or more embodiments the series of acts 1500 includes receiving, via the text field in the document creation interface, a document information prompt related to one or more modified digital document properties. Further, in one or more embodiments the series of acts 1500 includes based on the document information prompt, receiving a document information response from the large language model, the document information response comprising at least one modified digital document property. Further, in one or more embodiments, the series of acts 1500 includes receiving from the requestor device via the document creation interface, the modification prompt defining document modification parameters by receiving an indication of a first content item and a second content item from the content management system to provide to the large language model as part of the modification prompt.

Furthermore, in one or more embodiments the series of acts 1500 includes providing, for display on a requestor device associated with a user account, a document creation interface comprising an input field for entering text prompts to generate and modify digital documents. Moreover, in one or more embodiments, the series of acts 1500 includes receiving, from the requestor device via the document creation interface, a document generation prompt defining document parameters, the document parameters comprising an indication of a first content item and a second content item associated with the user account within a content management system. Further, in one or more embodiments, the series of acts 1500 includes in response to the document generation prompt, generating a digital document using a large language model to process the document parameters. Moreover, in one or more embodiments, the series of acts 1500 includes providing indication for display on the requestor device within the document creation interface, the indication comprises the generated digital document.

Moreover, in one or more embodiments the series of acts 1500 includes generating, for the digital document, a legitimacy score that indicates the digital document satisfying a similarity threshold for additional digital documents that previously received digital signatures. Further, in one or more embodiments the series of acts 1500 includes identifying at least one account that satisfies a similarity threshold with a recipient account associated with a recipient device. Further, in one or more embodiments, the series of acts 1500 includes determining a task completion metric associated with the at least one account. Moreover, in one or more embodiments the series of acts 1500 includes persisting a state of the interpreter corresponding to the first output. Further, in one or more embodiments the series of acts 1500 includes generating a time prediction for the recipient device completing a task related to the digital document based on the task completion metric.

Moreover, in one or more embodiments the series of acts 1500 includes receiving, from the requestor device, a modification prompt for the digital document, the modification prompt comprising an indication to replace the digital document with a different digital document. Further, in one or more embodiments the series of acts 1500 includes receiving a request from the requestor device to send the digital document in a target language to a recipient device to obtain a digital signature from the recipient device.

While FIG. 16 illustrates acts according to certain implementations, alternative implementations may omit, add to, reorder, and/or modify any of the acts shown in FIG. 16. The acts of FIG. 16 can be performed as part of a method. Alternatively, a non-transitory computer-readable medium can comprise instructions, that when executed by one or more processors, cause a computing device to perform the acts of FIG. 16. In still further implementations, a system can perform the acts of FIG. 16.

As illustrated in FIG. 16, a series of acts 1600 may include an act 1602 of generating a document summary that includes a condensed version of the digital document in a target language, an act 1604 of providing the document summary for display on a signor recipient device within a document review interface that includes document modification elements for modifying the digital document, an act 1606 of generating a suggested document modification element to include within the document review interface, and an act 1608 of in response to a user interaction with the suggested document modification element, generating a modified digital document.

In particular the act 1602 includes generating, utilizing a large language model to process a digital document, a document summary comprising a condensed version of the digital document in a target language associated with a user account of a signor recipient device. Further, the act 1604 includes providing the document summary for display on a signor recipient device within a document review interface comprising one or more document modification elements for modifying the digital document via the large language model. Moreover, the act 1606 includes generating a suggested document modification element to include within the document review interface based on one or more stored digital documents within a content management system. Additionally, the act 1608 includes in response to a user interaction with the suggested document modification element, generating, utilizing the large language model, a modified digital document to provide to a requestor device.

Further, in one or more embodiments the series of acts 1600 includes providing, to the signor recipient device, a text field in the document review interface for entering document modification prompts to modify the digital document. Additionally, in one or more embodiments the series of acts 1600 includes identifying one or more content items within the content management system that satisfy a similarity threshold with the digital document. Moreover, in one or more embodiments the series of acts 1600 includes identifying features associated with the signor recipient device. Furthermore, in one or more embodiments the series of acts 1600 includes generating the suggested document modification element based on the one or more content items that satisfies the similarity threshold or the features associated with the signor recipient device.

Furthermore, in one or more embodiments the series of acts 1600 includes providing to the signor recipient device a signature metric score that indicates at least one of: a percentage of additional signor recipient devices that signed the digital document, an average amount of time taken by the additional signor recipient devices to sign the digital document, and a signor document modification rate. Additionally, in one or more embodiments the series of acts 1600 includes identifying an additional digital document signed by the signor recipient device. Moreover, in one or more embodiments the series of acts 1600 includes generating the digital document with highlighted portions, highlighting portions that differ from the additional digital document. Further, in one or more embodiments the series of acts 1600 includes providing the digital document with highlighted portions to the signor recipient device.

Further, in one or more embodiments the series of acts 1600 includes providing a single selectable element option in the document review interface for the signor recipient device to sign all placeholder fields in response to a selection of the single selectable element option. Moreover, in one or more embodiments the series of acts 1600 includes utilizing the large language model to generate the digital document in the target language associated with the user account of the signor recipient device. Additionally, in one or more embodiments the series of acts 1600 includes identifying an additional signor recipient device with an additional target language associated with an additional user account of an additional signor recipient device. Moreover, in one or more embodiments the series of acts 1600 includes utilizing the large language model to generate the digital document in the additional target language. Further, in one or more embodiments the series of acts 1600 includes providing the digital document in the additional target language to the additional signor recipient device.

Additionally, in one or more embodiments the series of acts 1600 includes identifying additional user accounts corresponding to additional signor recipient devices that signed the digital document. Moreover, in one or more embodiments the series of acts 1600 includes generating a summary of the digital document to send to a recipient device along with a signature request of the digital document. Further, in one or more embodiments the series of acts 1600 for the additional signor recipient devices that signed the digital document, identifying prompts submitted by the additional signor recipient devices that satisfy a frequency threshold to utilize as the list of prompt suggestions.

Further, in one or more embodiments, the series of acts 1600 includes generating, utilizing a large language model to process a digital document, a document summary comprising a condensed version of the digital document in a target language associated with a user account of a signor recipient device. Furthermore, in one or more embodiments the series of acts 1600 includes providing the document summary for display on a signor recipient device within a document review interface comprising a text field in the document review interface for entering document modification prompts to modify the digital document via the large language model. Moreover, in one or more embodiments, the series of acts 1600 includes generating a suggested document modification element to include within the document review interface based on one or more stored digital documents within a content management system. Moreover, in one or more embodiments, the series of acts 1600 includes in response to a user interaction with the suggested document modification element, generating, utilizing the language model, a modified digital document to provide to a requestor device.

Further, in one or more embodiments, the series of acts 1600 includes generating a similarity threshold for the digital document. Moreover, in one or more embodiments the series of acts 1600 includes identifying one or more content items within the content management system that satisfy the similarity threshold with the digital document. Further, in one or more embodiments the series of acts 1600 includes generating the suggested document modification element based on identifying features associated with the signor recipient device comprising at least one of geographic location, language settings, age, and gender. Further, in one or more embodiments, the series of acts 1600 includes utilizing one or more content items that satisfies a similarity threshold with the digital document. Moreover, in one or more embodiments, the series of acts 1600 includes utilizing features associated with the signor recipient device.

Moreover, in one or more embodiments the series of acts 1600 includes identifying additional signor recipient devices that signed the digital document. Further, in one or more embodiments the series of acts 1600 includes identifying an average amount of time taken by the additional signor recipient devices to sign the digital document. Further, in one or more embodiments, the series of acts 1600 includes identifying a signor document modification rate.

Furthermore, in one or more embodiments the series of acts 1600 includes generating the modified digital document by depicting within the digital document, redlined portions that indicate a difference between the modified digital document and the digital document. Moreover, in one or more embodiments, the series of acts 1600 includes providing a single selectable element option in the document review interface for the signor recipient device to sign all placeholder fields in response to a selection of the single selectable element option.

Further, in one or more embodiments, the series of acts 1600 includes generating, utilizing a large language model to process a digital document, a document summary comprising a condensed version of the digital document in a target language associated with a user account of a signor recipient device. Moreover, in one or more embodiments, the series of acts 1600 includes providing the document summary for display on a signor recipient device within a document review interface comprising document modification elements for modifying the digital document via the large language model. Moreover, in one or more embodiments the series of acts 1600 includes generating a suggested document modification element to include within the document review interface based on one or more stored digital documents within a content management system. Further, in one or more embodiments the series of acts 1600 includes in response to a user interaction with the suggested document modification element, generating, using the large language model, a modified digital document with redlined portions that indicate a difference between the digital document and the modified digital document to provide to a requestor device.

Further, in one or more embodiments, the series of acts 1600 includes providing, to the signor recipient device, a text field in the document review interface for entering document modification prompts to modify the digital document. Moreover, in one or more embodiments the series of acts 1600 includes providing to the signor recipient device a signature metric score that indicates at least one of: a percentage of additional signor recipient devices that signed the digital document, an average amount of time taken by the additional signor recipient devices to sign the digital document, and a signor document modification rate.

Further, in one or more embodiments the series of acts 1600 includes identifying an additional digital document signed by the signor recipient device within a predetermined time threshold. Moreover, in one or more embodiments the series of acts 1600 includes generating the digital document with highlighted portions, highlighting portions that differ from the additional digital document. Further, in one or more embodiments the series of acts 1600 includes providing the digital document with highlighted portions to the signor recipient device.

Further, in one or more embodiments the series of acts 1600 includes identifying additional signor recipient devices that signed the digital document. Moreover, in one or more embodiments the series of acts 1600 includes for the additional signor recipient devices that signed the digital document, identifying prompts submitted by the additional signor recipient devices that satisfy a frequency threshold to utilize as prompt suggestions for the signor recipient device.

The components of the intelligent document system 102 can include software, hardware, or both. For example, the components of the intelligent document system 102 can include one or more instructions stored on a computer-readable storage medium and executable by processors of one or more computing devices. When executed by one or more processors, the computer-executable instructions of the intelligent document system 102 can cause a computing device to perform the methods described herein. Alternatively, the components of the intelligent document system 102 can comprise hardware, such as a special purpose processing device to perform a certain function or group of functions. Additionally or alternatively, the components of the intelligent document system 102 can include a combination of computer-executable instructions and hardware.

Furthermore, the components of the intelligent document system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the intelligent document system 102 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
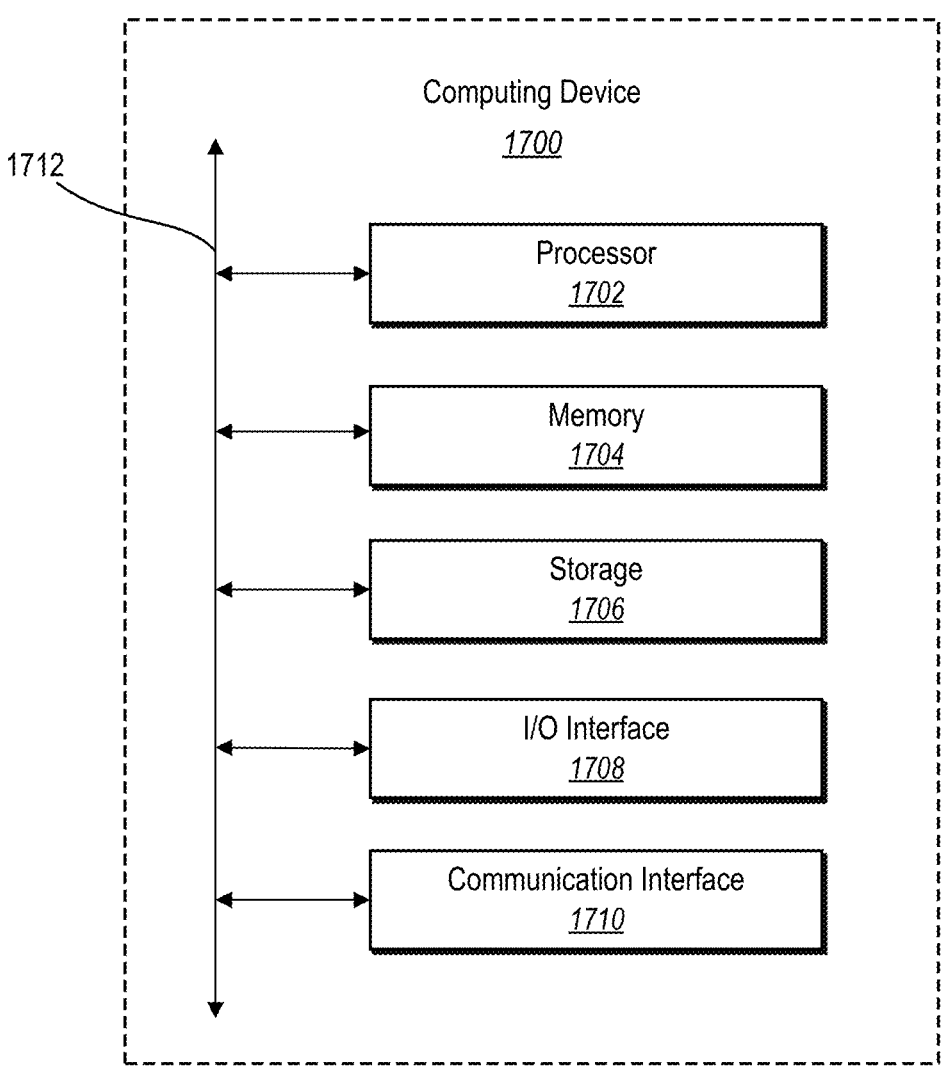
FIG. 17 illustrates a block diagram of an exemplary computing device in accordance with one or more embodiments.

FIG. 17 illustrates a block diagram of exemplary computing device 1700 (e.g., the server(s) 104, the server(s) 116, and/or the client device 120) that may be configured to perform one or more of the processes described above. One will appreciate that server(s) 104 and/or the client device 120 may comprise one or more computing devices such as computing device 1700. As shown by FIG. 17, computing device 1700 can comprise processor 1702, memory 1704, storage device 1706, I/O interface 1708, and communication interface 1710, which may be communicatively coupled by way of communication infrastructure 1712. While an exemplary computing device 1700 is shown in FIG. 17, the components illustrated in FIG. 17 are not intended to be limiting. Additional or alternative components may be used in other implementations. Furthermore, in certain implementations, computing device 1700 can include fewer components than those shown in FIG. 17. Components of computing device 1700 shown in FIG. 17 will now be described in additional detail.

In particular implementations, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage device 1706 and decode and execute them. In particular implementations, processor 1702 may include one or more internal caches for data, instructions, or addresses. As an example and not by way of limitation, processor 1702 may include one or more instruction caches, one or more data caches, and one or more translation lookaside buffers (TLBs). Instructions in the instruction caches may be copies of instructions in memory 1704 or storage device 1706.

Memory 1704 may be used for storing data, metadata, and programs for execution by the processor(s). Memory 1704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1704 may be internal or distributed memory.

Storage device 1706 includes storage for storing data or instructions. As an example and not by way of limitation, storage device 1706 can comprise a non-transitory storage medium described above. Storage device 1706 may include a hard disk drive (HDD), a floppy disk drive, flash memory, an optical disc, a magneto-optical disc, magnetic tape, or a Universal Serial Bus (USB) drive or a combination of two or more of these. Storage device 1706 may include removable or non-removable (or fixed) media, where appropriate. Storage device 1706 may be internal or external to computing device 1700. In particular implementations, storage device 1706 is non-volatile, solid-state memory. In other implementations, Storage device 1706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1708 allows a user to provide input to, receive output from, and otherwise transfer data to and receive data from computing device 1700. I/O interface 1708 may include a mouse, a keypad or a keyboard, a touch screen, a camera, an optical scanner, network interface, modem, other known I/O devices or a combination of such I/O interfaces. I/O interface 1708 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1708 is configured to provide graphical data to a display for presentation to a user. The graphical data may be representative of one or more graphical user interfaces and/or any other graphical content as may serve a particular implementation.

Communication interface 1710 can include hardware, software, or both. In any event, communication interface 1710 can provide one or more interfaces for communication (such as, for example, packet-based communication) between computing device 1700 and one or more other computing devices or networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1712 may include hardware, software, or both that couples components of computing device 1700 to each other. As an example and not by way of limitation, communication infrastructure 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 18:
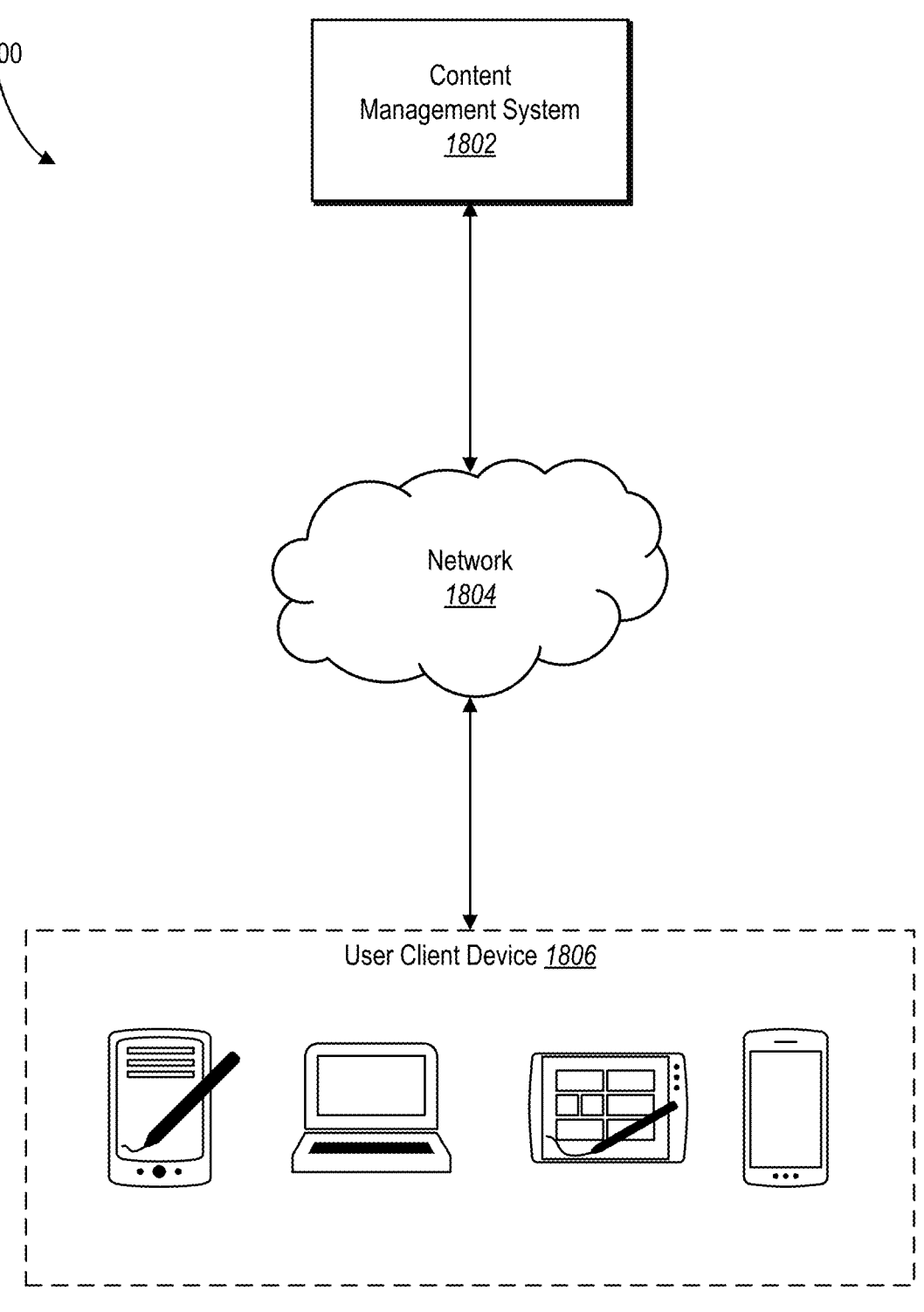
FIG. 18 illustrates an example environment of a networking system having the custom interpreter system in accordance with one or more embodiments.

FIG. 18 is a schematic diagram illustrating environment 1800 within which one or more implementations of the intelligent document system 102 can be implemented. For example, the intelligent document system 102 may be part of a content management system 1802 (e.g., the content management system 108). Content management system 1802 may generate, store, manage, receive, and send digital content (such as digital content items). For example, content management system 1802 may send and receive digital content to and from client device of client devices 1806 by way of network 1804. In particular, content management system 1802 can store and manage a collection of digital content. Content management system 1802 can manage the sharing of digital content between computing devices associated with a plurality of users. For instance, content management system 1802 can facilitate a user sharing a digital content with another user of content management system 1802.

In particular, content management system 1802 can manage synchronizing digital content across multiple client devices 1806 associated with one or more users. For example, a user may edit digital content using a client device of the client device 1806. The content management system 1802 can cause client device of the client devices 1806 to send the edited digital content to content management system 1802. Content management system 1802 then synchronizes the edited digital content on one or more additional computing devices.

In addition to synchronizing digital content across multiple devices, one or more implementations of content management system 1802 can provide an efficient storage option for users that have large collections of digital content. For example, content management system 1802 can store a collection of digital content on content management system 1802, while the client device of the client devices 1806 only stores reduced-sized versions of the digital content. A user can navigate and browse the reduced-sized versions (e.g., a thumbnail of a digital image) of the digital content on client device of the client devices 1806. In particular, one way in which a user can experience digital content is to browse the reduced-sized versions of the digital content on client device of client devices 1806.

Another way in which a user can experience digital content is to select a reduced-size version of digital content to request the full- or high-resolution version of digital content from content management system 1802. In particular, upon a user selecting a reduced-sized version of digital content, client device of client devices 1806 sends a request to content management system 1802 requesting the digital content associated with the reduced-sized version of the digital content. Content management system 1802 can respond to the request by sending the digital content to client device of client devices 1806. Client device of client devices 1806, upon receiving the digital content, can then present the digital content to the user. In this way, a user can have access to large collections of digital content while minimizing the amount of resources used on client device of client devices 1806.

client device of client devices 1806 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices, client device of client devices 1806 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1804.

Network 1804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client device of client devices 1806 may access content management system 1802.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed:

1. A computer-implemented method comprising:
providing, for display on a requestor device associated with a user account, a document creation interface comprising an input field to generate and modify digital documents;
receiving, from the requestor device via the document creation interface, a document generation prompt defining document parameters;
in response to the document generation prompt, generating a digital document using a large language model to process the document parameters based on content items stored for the user account within a content management system;
generating, for the digital document, a score that indicates a likelihood of a recipient device providing a digital signature for the digital document, wherein the score comprises an indication of whether the recipient device previously provided a digital signature related to a different digital document; or
generating, for the digital document, an additional score that indicates an additional likelihood of the recipient device providing the digital signature for the digital document, wherein the additional score comprises an additional indication of digital signature rates for additional digital documents within the content management system that satisfy a similarity threshold with the digital document; and
providing, within the document creation interface on the requestor device, a selectable file element that represents the digital document and the score for the digital document or the additional score for the digital document, wherein a selection of the selectable file element transitions the document creation interface to a file view that displays contents of the digital document.

2. The computer-implemented method of claim 1, further comprising:
receiving, from the requestor device, a document modification prompt for the digital document, the document modification prompt defining at least one additional document parameter;
in response to the document modification prompt, generating a modified digital document using the large language model; and
providing an additional indication of the modified digital document for display on the requestor device within the document creation interface.

3. The computer-implemented method of claim 1, further comprising:
receiving, via the input field in the document creation interface, a document information prompt related to one or more digital document properties; and
based on the document information prompt, receiving a document information response from the large language model, the document information response comprising at least one digital document property.

4. The computer-implemented method of claim 1, further comprising generating, for the digital document, a score that indicates a likelihood of the recipient device completing a task related to the digital document.

5. The computer-implemented method of claim 1, wherein generating the score or the additional score comprises:

identifying an additional recipient device and whether the additional recipient device previously provided an additional digital signature related to another digital document; or comparing embeddings of the digital document with additional embeddings within the content management system to generate measures of similarity between the digital document and the additional digital documents within the content management system; and identifying a subset of the additional digital documents from the additional digital documents within the content management system based on the additional digital documents satisfying a similarity threshold with the digital document.

6. The computer-implemented method of claim 1, further comprising generating a time prediction for the recipient device completing a task related to the digital document, wherein generating the time prediction comprises:

identifying at least one account that satisfies an additional similarity threshold with a recipient account associated with the recipient device;

determining a task completion metric associated with the at least one account; and generating the time prediction based on the task completion metric.

7. The computer-implemented method of claim 1, further comprising:

generating a time prediction for the recipient device to provide the digital signature for the digital document; and generating a suggestion to modify the digital document to reduce the time prediction for the recipient device to provide the digital signature for the digital document.

8. The computer-implemented method of claim 1, wherein receiving, from the requestor device via the document creation interface, the document generation prompt defining document parameters further comprises receiving an indication of a first content item and a second content item from the content management system to provide to the large language model as part of the document generation prompt.

9. The computer-implemented method of claim 1, further comprising:

generating a summary of the digital document to send to the recipient device along with a signature request of the digital document; and providing, for display on the requestor device, and editable version of the summary of the digital document.

10. The computer-implemented method of claim 1, further comprising:

providing the digital document as a PDF file; and receiving a request from the requestor device to send the digital document as the PDF file to the recipient device to obtain a digital signature from the recipient device.

11. A system comprising:

at least one processor; and a non-transitory computer-readable medium storing instructions which, when executed by the at least one processor, cause the system to:

provide, for display on a requestor device associated with a user account, a document creation interface comprising an input field to generate and modify digital documents;

receive, from the requestor device via the document creation interface, a document generation prompt defining document parameters;

in response to the document generation prompt, generate a digital document using a large language model to process the document parameters based on content items stored for the user account within a content management system;

in response to a modification prompt defining modified document parameters for the digital document, generate a modified digital document using the large language model;

generate, for the digital document, a score that indicates a likelihood of a recipient device providing a digital signature for the modified digital document, wherein the score comprises an indication of whether the recipient device previously provided a digital signature related to a different digital document; or generate, for the digital document, an additional score that indicates an additional likelihood of the recipient device providing the digital signature for the modified digital document, wherein the additional score comprises an additional indication of digital signature rates for additional digital documents within the content management system that satisfy a similarity threshold with the modified digital document; and provide, within the document creation interface, a selectable file element that represents the modified digital document and the score for the modified digital document or the additional score for the modified digital document, wherein a selection of the selectable file element transitions the document creation interface to a file view that displays contents of the modified digital document.

12. The system of claim 11, further storing instructions which, when executed by the at least one processor, cause the system to:

provide an indication of the digital document for display on the requestor device within the document creation interface as a selectable content item; and receive, from the requestor device, the modification prompt for the digital document, the modification prompt comprising an indication to modify a portion of the digital document.

13. The system of claim 11, further storing instructions which, when executed by the at least one processor, cause the system to:

receive an additional modification prompt for the modified digital document; and generate an additional modified digital document based on the additional modification prompt.

14. The system of claim 11, further storing instructions, which when executed by the at least one processor cause the system to:

receive, via the input field in the document creation interface, a document information prompt related to one or more modified digital document properties; and based on the document information prompt, receiving a document information response from the large language model, the document information response comprising at least one modified digital document property.

15. The system of claim 11, further storing instructions, which when executed by the at least one processor cause the system to receive, from the requestor device via the document creation interface, the modification prompt defining document modification parameters by receiving an indication of a first content item and a second content item from the content management system to provide to the large language model as part of the modification prompt.

16. A non-transitory computer-readable medium storing executable instructions which, when executed by at least one processor, cause the at least one processor to:

provide, for display on a requestor device associated with a user account, a document creation interface comprising an input field for entering text prompts to generate and modify digital documents;

receive, from the requestor device via the document creation interface, a document generation prompt defining document parameters, the document parameters comprising an indication of a first content item and a second content item associated with the user account within a content management system;

in response to the document generation prompt, generate a digital document using a large language model to process the document parameters;

generate, for the digital document, a score that indicates a likelihood of a recipient device providing a digital signature for the digital document, wherein the score comprises an indication of whether the recipient device previously provided a digital signature related to a different digital document; or generate, for the digital document, an additional score that indicates an additional likelihood of the recipient device providing the digital signature for the digital document, wherein the additional score comprises an additional indication of digital signature rates for additional digital documents within the content management system that satisfy a similarity threshold with the digital document; and provide, within the document creation interface on the requestor device, a selectable file element that represents the digital document and the score for the digital document or the additional score for the digital document or the additional score for the digital document, wherein a selection of the selectable file element transitions the document creation interface to a file view that displays contents of the digital document.

17. The non-transitory computer-readable medium of claim 16, further storing instructions which, when executed by the at least one processor, cause the at least one processor to generate, for the digital document, a legitimacy score that indicates the digital document satisfying a similarity threshold for additional digital documents that previously received digital signatures.

18. The non-transitory computer-readable medium of claim 16, further storing instructions which, when executed by the at least one processor, cause the at least one processor to:

identify at least one account that satisfies an additional similarity threshold with a recipient account associated with the recipient device;

determine a task completion metric associated with the at least one account; and generate a time prediction for the recipient device completing a task related to the digital document based on the task completion metric.

19. The non-transitory computer-readable medium of claim 16, further storing instructions which, when executed by the at least one processor, cause the at least one processor to receive, from the requestor device, a modification prompt for the digital document, the modification prompt comprising an indication to replace the digital document with a different digital document.

20. The non-transitory computer-readable medium of claim 16, further storing instructions which, when executed by the at least one processor, cause the at least one processor to receive a request from the requestor device to send the digital document in a target language to the recipient device to obtain a digital signature from the recipient device.

* * * * *